United States Patent [19]
Matyas et al.

[11] Patent Number: 5,142,578
[45] Date of Patent: Aug. 25, 1992

[54] HYBRID PUBLIC KEY ALGORITHM/DATA ENCRYPTION ALGORITHM KEY DISTRIBUTION METHOD BASED ON CONTROL VECTORS

[75] Inventors: Stephen M. Matyas; Donald B. Johnson; An V. Le, all of Manassas; Rostislaw Prymak, Dumfries; John D. Wilkins, Somerville, all of Va.; William C. Martin, Concord; William S. Rohland, Charlotte, both of N.C.

[73] Assignee: International Business Machines Corporation, Armonk, N.Y.

[21] Appl. No.: 748,407

[22] Filed: Aug. 22, 1991

[51] Int. Cl.$^5$ ............................................. H04L 9/30
[52] U.S. Cl. ...................................... 380/21; 380/30; 380/49
[58] Field of Search ................. 380/21, 25, 30, 49

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/30 |
| 4,677,670 | 6/1987 | Henderson, Jr. | 380/25 |
| 4,817,144 | 3/1989 | Citta et al. | 380/21 |
| 4,850,017 | 7/1989 | Matyas, Jr. et al. | 380/21 |
| 4,908,861 | 3/1990 | Brachtl et al. | 380/30 |
| 4,918,728 | 4/1990 | Matyas et al. | 380/21 |
| 4,924,514 | 5/1990 | Matyas et al. | 380/25 |
| 4,924,515 | 5/1990 | Matyas et al. | 380/25 |
| 4,941,176 | 7/1990 | Matyas et al. | 380/21 |
| 4,993,069 | 2/1991 | Matyas et al. | 380/21 |
| 5,007,089 | 4/1991 | Matyas et al. | 380/49 |
| 5,073,934 | 12/1991 | Matyas et al. | 380/30 |
| 5,103,478 | 4/1992 | Matyas et al. | 380/21 |

OTHER PUBLICATIONS

R. W. Jones, "Some Techniques for Handling Encipherment Keys," ICL Technical Journal, Nov. 1982, pp. 175-188.
D. W. Davies & W. L. Price, "Security for Computer Networks," John Wiley & Sons, N.Y., 1984, Sec. 6.5, Key Management With Tagged Keys, pp. 168-172.
W. Diffie, et al., "Privacy and Authentication: An Introduction to Cryptography," Proc. of IEEE, vol. 67, No. 3, Mar. 1979; pp. 397-427.

*Primary Examiner*—Salvatore Cangialosi
*Attorney, Agent, or Firm*—John E. Hoel

[57] ABSTRACT

The patent describes a method and apparatus for securely distributing an initial Data Encryption Algorithm (DEA) key-encrypting key by encrypting a key record (consisting of the key-encrypting key and control information associated with that key-encrypting key) using a public key algorithm and a public key belonging to the intended recipient of the key record. The patent further describes a method and apparatus for securely recovering the distributed key-encrypting key by the recipient by decrypting the received key record using the same public key algorithm and private key associated with the public key and re-encrypting the key-encrypting key under a key formed by arithmetically combining the recipient's master key with a control vector contained in the control information of the received key record. Thus the type and usage attributes assigned by the originator of the key-encrypting key in the form of a control vector are cryptographically coupled to the key-encrypting key such that the recipient may only use the received key-encrypting key in a manner defined by the key originator.

The patent further describes a method and apparatus to improve the integrity of the key distribution process by applying a digital signature to the key record and by including identifying information (i.e., an originator identifier) in the control information of the key record. The integrity of the distribution process is enhanced by verifying the digital signature and originator identifier at the recipient node.

25 Claims, 9 Drawing Sheets

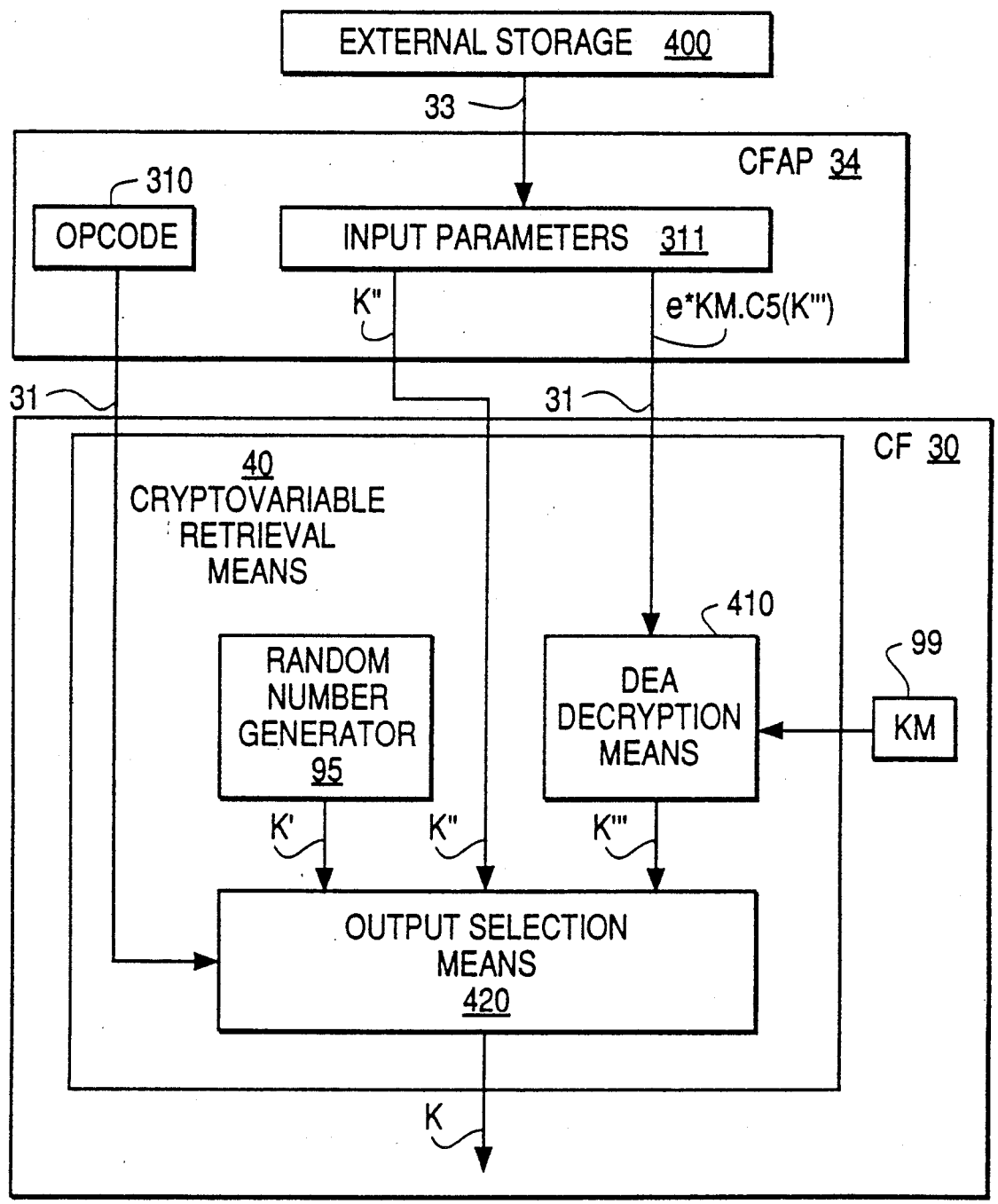

HYBRID PUBLIC KEY ALGORITHM/DATA ENCRYPTION ALGORITHM KEY DISTRIBUTION METHOD BASED ON CONTROL VECTORS

BACKGROUND OF THE INVENTION

1. Technical Field

The invention disclosed broadly relates to data processing systems and methods and more particularly relates to cryptographic systems and methods for use in data processing systems to enhance security.

2. Background Art

The following patents are related to this invention and are incorporated herein by reference:

B. Brachtl, et al., "Controlled Use of Cryptographic Keys Via Generating Stations Established Control Values," U.S. Pat. No. 4,850,017, issued Jul. 18, 1989, assigned to IBM Corporation, and incorporated herein by reference.

S. M. Matyas, et al., "Secure Management of Keys Using Control Vectors," U.S. Pat. No. 4,941,176, issued Jul. 10, 1990, assigned to IBM Corporation and incorporated herein by reference.

S. M. Matyas, et al., "Data Cryptography Operations Using Control Vectors," U.S. Pat: No. 4,918,728, issued Apr. 17, 1990, assigned to IBM Corporation, and incorporated herein by reference.

S. M. Matyas, et al., "Personal Identification Number Processing Using Control Vectors," U.S. Pat. No. 4,924,514, issued May 8, 1990, assigned to IBM Corporation and incorporated herein by reference.

S. M. Matyas, et al., "Secure Management of Keys Using Extended Control Vectors," U.S. Pat. No. 4,924,515, issued May 8, 1990, assigned to IBM Corporation and incorporated herein by reference.

S. M. Matyas, et al., "Secure Key Management Using Programmable Control Vector Checking," U.S. Pat. No. 5,007,089, issued Apr. 9, 1991, assigned to IBM Corporation and incorporated herein by reference.

B. Brachtl, et al., "Data Authentication Using Modification Detection Codes Based on a Public One Way Encryption Function," U.S. Pat. No. 4,908,861, issued Mar. 13, 1990, assigned to IBM Corporation and incorporated herein by reference.

D. Abraham, et al., "Smart Card Having External Programming Capability and Method of Making Same," U.S. Pat. application Ser. No. 004,501, filed Jan. 19, 1987, assigned to IBM Corporation, and incorporated herein by reference.

S. M. Matyas, et al., "Method and Apparatus for Controlling the Use of a Public Key, Based on the Level of Import Integrity for the Key," U.S. Pat. application Ser. 07/602,989, filed Oct. 24, 1990, assigned to the IBM Corporation.

S. M. Matyas, et al., "Secure Key Management Using Programmable Control Vector Checking," U.S. Pat. No. 5,007,089, issued Apr. 9, 1991, assigned to IBM Corporation and incorporated herein by reference.

The cryptographic architecture described in the cited patents by S. M. Matyas, et al. is based on associating with a cryptographic key, a control vector which provides the authorization for the uses of the key intended by the originator of the key. The cryptographic architecture described in the cited patents by S. M. Matyas, et al. is based on the Data Encryption Algorithm (DEA), whereas the present invention is based on both a secret key algorithm, such as the DEA, and a public key algorithm. Various key management functions, data cryptography functions, and other data processing functions are possible using control vectors, in accordance with the invention. A system administrator can exercise flexibility in the implementation of his security policy by selecting appropriate control vectors in accordance with the invention. A cryptographic facility (CF) in the cryptographic architecture is described in the above cited patents by S. M. Matyas, et al. The CF is an instruction processor for a set of cryptographic instructions, implementing encryption methods and key generation methods. A memory in the crypto facility stores a set of internal cryptographic variables. Each cryptographic instruction is described in terms of a sequence of processing steps required to transform a set of input-parameters to a set of output parameters. A cryptographic facility application program is also described in the referenced patents and patent applications, which defines an invocation method, as a calling sequence, for each cryptographic instruction consisting of an instruction mnemonic and an address with corresponding input and output parameters.

Public key encryption algorithms are described in a paper by W. Diffie and M. E. Hellman entitled "Privacy and Authentication: An Introduction to Cryptography," Proceedings of the IEEE, Vol. 67, No. 3, Mar. 1979, pp. 397-427. Public key systems are based on dispensing with the secret key distribution channel, as long as the channel has a sufficient level of integrity. In a public key crypto system, two keys are used, one for enciphering and one for deciphering. Public key algorithm systems are designed so that it is easy to generate a random pair of inverse keys PU for enciphering and PR for deciphering and it is easy to operate with PU and PR, but is computationally infeasible to compute PR from PU. Each user generates a pair of inverse transforms, PU and PR. He keeps the deciphering transformation PR secret, and makes the enciphering transformation PU public by placing it in a public directory. Anyone can now encrypt messages and send them to the user, but no one else can decipher messages intended for him. It is possible, and often desirable, to encipher with PU and decipher with PR. For this reason, PU is usually referred to as a public key and PR is usually referred to as a private key. A corollary feature of public key crypto systems is the provision of a digital signature which uniquely identifies the sender of a message. If user A wishes to send a signed message M to user B, he operates on it with his private key PR to produce the signed message S. PR was used as A's deciphering key when privacy was desired, but it is now used as his "enciphering" key. When user B receives the message S, he can recover the message M by operating on the ciphertext S with A's public PU. By successfully decrypting A's message, the receiver B has conclusive proof it came from the sender A. Examples of public key cryptography are provided in the following U.S. Pat. Nos.:

U.S. Pat. No. 4,218,582 to Hellman, et al., "Public Key Cryptographic Apparatus and Method;" U.S. Pat. No. 4,200,770 to Hellman, et al., "Cryptographic Apparatus and Method;" and U.S. Pat. No. 4,405,829 to Rivest, et al., "Cryptographic Communications System and Method," which discloses the RSA public-key algorithm.

In general, it is preferable for performance reasons to use symmetric algorithms such as the Data Encryption Algorithm (DEA) bulk data encryption rather to use a public key algorithm for such purposes. However to use DEA both the data originator and intended recipient must first share a common, secret key. This requires the secure distribution of at least one DEA key for each secure "channel" between originator and recipient. The problem can be reduced to distributing one secret DEA key-encrypting key (KEK) between the originating node and receiving node, and thereafter transmitting all other DEA keys encrypted under this common KEK. The usual method of distributing the initial KEK is via trusted couriers.

It is well-known that a hybrid system employing a public key algorithm and the DEA may be effective in solving the initial KEK distribution problem, while still retaining the faster bulk data encryption capabilities of the DEA. In such a hybrid cryptographic system A, a public key PU is transmitted with integrity (see S. M. Matyas, et al., "Method and Apparatus for Controlling the Use of a Public Key, Based on the Level of Import Integrity for the Key", U.S. application Ser. No. 07/602,989, filed Oct. 24, 1990) to a second hybrid cryptographic system B. A secret DEA KEK, say KK, is generated and encrypted under PU at system B and transmitted to system A. System A uses the corresponding private key PR to decrypt KK. KK may then be used with the DEA algorithm to distribute additional DEA keys for use by systems A and B.

Prior art, however, has not provided a cryptographically secure means to define the type and to control the usage of the generated KEK to insure that the type and uses defined by the originator of the key (system B) are enforced at both the originating node and the recipient node (system A). Without such controls (as described in S. M. Matyas, et al., "Secure Management of Keys Using Control Vectors", U.S. Pat. No. 4,941,176, issued Jul. 10, 1990), the distributed KEK may be subject to misuse by either party to weaken the security of the system (e.g., by allowing the KEK to h=used in a data decrypt operation and thus allowing DEA keys encrypted under the KEK to be decrypted and exposed in the clear).

While the prior art addresses the concept of unidirectional key-encrypting keys, i.e., key-encrypting keys that establish a key distribution channel in one direction only, the method for establishing, with integrity, such a unidirectional channel using a public key algorithm has not been addressed. To accomplish this, a unique Environment Identifier (EID) is stored at each cryptographic device such that a distributed key-encrypting key can be imported only at the designated receiving device, but it does not allow the key-encrypting key to be imported or re-imported at the sending device, as described below.

The originating node B generates the KEK in two forms: one form to be exported to the recipient node A (encrypted under the PU received from A) and a second form to be used at B ultimately to either export or import additional DEA keys (encrypted under some form of the local master key). As was described in the above reference U.S. Pat. No. 4,941,176, "Secure Management of Keys Using Control Vectors," it is critical to the security of each cryptographic system that the type and usage attributes of a given KEK on one system be limited to either EXPORTER usage or IMPORTER usage, but never both. Correspondingly, it must not be possible to generate or introduce two copies of the same KEK into the system, one with EXPORTER usage and one with IMPORTER usage. Such a pair of key forms is known as a bi-functional key pair.

Prior art has provided no cryptographically secure means to insure that the generated KEK cannot be re-imported into the originating node to form a bi-functional key pair. Since key PU is public, system A cannot be certain that system B is the originator of the generated KEK.

OBJECTS OF THE INVENTION

It is therefore an object of the invention to provide an improved method for distributing DEA keys using a public key crypto system.

It is another object of the invention to provide an improved method of distributing a DEA key-encrypting key using a public key crypto system.

It is another object of the invention to provide an improved method of distributing a DEA key-encrypting key that does not require the use of couriers.

It is another object of the invention to provide control information associated with a distributed key, which defines the type and usage of the distributed key.

It is another object of the invention to provide a means to cryptographically couple the control information and key using a public-key algorithm.

It is another object of the invention to provide control information that prevents a distributed key from being imported at the originating device.

It is another object of the invention to provide a method of key distribution which is compatible with a key management based on control vectors (in the above referenced patents).

It is another object of the invention to provide a method of key distribution that does not also provide a covert privacy channel.

It is another object of the invention to provide a means for a receiving device to validate that a received distributed key has originated with an expected originating device.

It is another object of the invention to provide a means for a distributed key to be authenticated on the basis of a signature generated on the distributed key by the cryptographic system software.

It is still a further object of the invention to provide a higher integrity means for a distributed key to be authenticated on the basis of a signature generated on the distributed key as an integral part of the cryptographic system hardware export function.

SUMMARY OF THE INVENTION

These and other objects, features, and advantages are accomplished by the invention disclosed herein. A method and apparatus are disclosed for generating and distributing a DEA key-encrypting key from a sending device implementing a public-key cryptographic system to a receiving device implementing a public-key cryptographic system. The method and apparatus find application in a cryptographic system implementing both a symmetric encryption algorithm, such as the Data Encryption Standard, and an asymmetric encryption algorithm, such as the RSA public-key algorithm. The method begins by generating a key-encrypting key at a sending device and producing two encrypted copies of the generated key. The generated key is encrypted first under the public key of a designated receiving device and the encrypted key is then electronically transmitted to the receiving device. The generated key is also encrypted under the master key of the sending device and stored in a key storage for later use in a DEA key management scheme for distributing further DEA keys to the designated receiving device. At the receiving device, the encrypted key is decrypted using the private key of the receiving device and the clear key is then re-encrypted under the master key of the receiving device and the encrypted key is stored in a key storage for later use in a DEA key management scheme for receiving further DEA keys from the same sending device. In accordance with the invention, the method of key distribution makes use of a key block containing the distributed key-encrypting key and control information associated with the distributed key, which includes a control vector to limit uses of the key and an environment ID to identify the sender of the key. The method of key distribution also makes use of an optional digital signature generated on the encrypted key block at the originating device and validated at the receiving device.

BRIEF DESCRIPTION OF THE DRAWINGS

These and other objects, features, and advantages of the invention will be more fully appreciated with reference to the accompanying figures.

FIG. 16 is a block diagram of the crypto-variable retrieval means 40 which is a component of the cryptographic facility shown in FIG. 14.

DESCRIPTION OF THE BEST MODE FOR CARRYING OUT THE INVENTION

Figure 1:
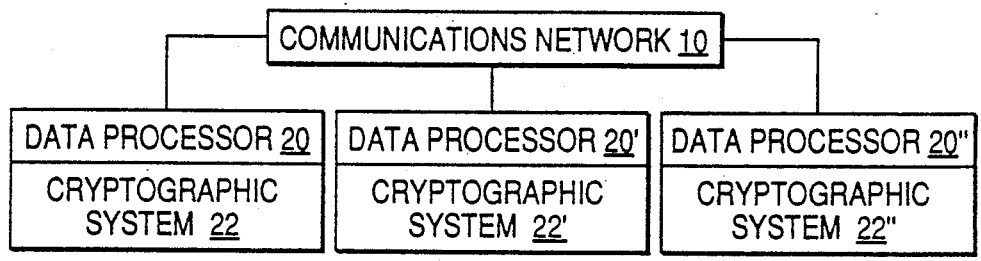
FIG. 1 illustrates a communications network 10 including a plurality of data processors, each of which includes a cryptographic system.

Environment Description: FIG. 1 illustrates a network block diagram showing a communications network 10 to which is connected a plurality of data processors including data processor 20, data processor 20', and data processor 20''. Also included in each data processor is a cryptographic system, as shown in FIG. 1. Data processor 20 includes cryptographic system 22, data processor 20' includes cryptographic system 22' and data processor 20'' includes cryptographic system 22''. Each data processor supports the processing of one or more applications which require access to cryptographic services such as for the encryption, decryption and authenticating of application data and the generation and installation of cryptographic keys. The cryptographic services are provided by a secure cryptographic facility in each cryptographic system. The network provides the means for the data processors to send and receive encrypted data and keys. Various protocols, that is, formats and procedural rules, govern the exchange of cryptographic quantities between communicating data processors in order to ensure the interoperability between them.

Figure 2:
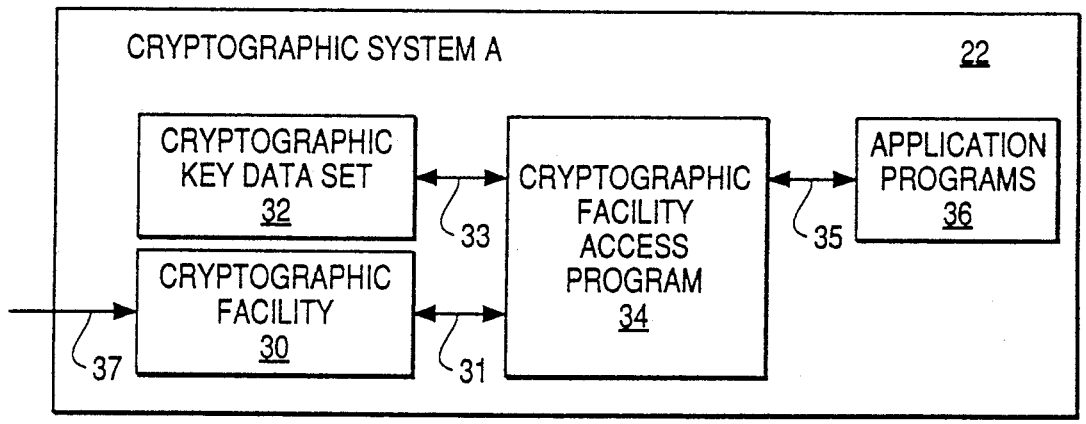
FIG. 2 is a block diagram of a cryptographic system 22.

FIG. 2 illustrates the cryptographic system 22. In the cryptographic system 22, the cryptographic facility (CF) 30 has an input 37 from a physical interface. The cryptographic facility access program (CFAP) 34 is coupled to the cryptographic facility 30 by means of the interface 31. The cryptographic key data set (CKDS) 32 is connected to the cryptographic facility access program 34 by means of the interface 33. The application programs (APPL) 36 are connected to the cryptographic facility access program 34 by means of the interface 35.

A typical request for cryptographic service is initiated by APPL 36 via a function call to the CFAP 34 at the interface 35. The service request includes key and data parameters, as well as key identifiers which the CFAP 34 uses to access encrypted keys from the CKDS 32 at the interface 33. The CFAP 34 processes the service request by issuing one or more cryptographic access instructions to the CF 30 at the interface 31. The CF 30 may also have an optional physical interface 37 for direct entry of cryptographic variables into the CF 30. Each cryptographic access instruction invoked at the interface 31 has a set of input parameters processed by the CF 30 to produce a set of output parameters returned by the CF 30 to the CFAP 34. In turn, the CFAP 34 may return output parameters to the APPL 36. The CFAP 34 may also use the output parameters and input parameters to subsequently invoke instructions. If the output parameters contain encrypted keys, then the CFAP 34, in many cases, may store these encrypted keys in the CKDS 32.

Figure 3:
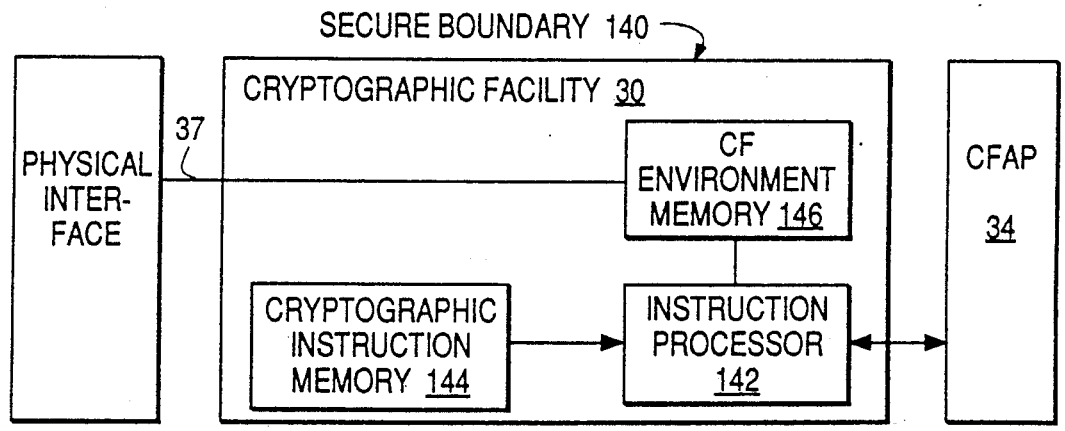
FIG. 3 is a block diagram of a cryptographic facility 30.

FIG. 3 illustrates the cryptographic facility 30. The cryptographic facility 30 is maintained within a secure boundary 140. The cryptographic facility 30 includes the instruction processor 142 which is coupled to the cryptographic algorithms 144 which are embodied as executable code. The cryptographic facility environment memory 146 is coupled to the instruction processor 142. The physical interface can be coupled over line 37 to the CF environment memory 146, as shown in the figure. The instruction processor 142 is coupled to the cryptographic facility access program (CFAP) 34 by means of the interface at 31.

The instruction processor 142 is a functional element which executes cryptographic microinstructions invoked by the CFAP access instruction at the interface 31. For each access instruction, the interface 31 first defines an instruction mnemonic or operation code used to select particular microinstructions for execution. Secondly a set of input parameters is passed from the CFAP 34 to the CF 30. Thirdly, a set of output parameters is returned by the CF 30 to the CFAP 34. The instruction processor 142 executes the selected instruction by performing an instruction specific sequence of cryptographic processing steps embodied as microinstructions stored in cryptographic microinstruction memory 144. The control flow and subsequent output of the cryptographic processing steps depend on the values of the input parameters and the contents of the CF environment memory 146. The CF environment memory 146 consists of a set of cryptographic variables, for example keys, flags, counters, CF configuration data, etc., which are collectively stored within the CF 30. The CF environment variables in memory 146 are initialized via the interface 31, that is by execution of certain CF microinstructions which read input parameters and load them into the CF environment memory 146. Alternately, initialization can be done via an optional physical interface which permits cryptographic variables to be loaded directly into the CF environment memory 146, for example via an attached key entry device.

The physical embodiment of the cryptographic facility secure boundary 140, incorporates the following physical security features. The physical embodiment resists probing by an insider adversary who has limited access to the cryptographic facility 30. The term "limited" is measured in minutes or hours as opposed to days or weeks. The adversary is constrained to a probing attack at the customer's site using limited electronic devices as opposed to a laboratory attack launched at a site under the control of the adversary using sophisticated electronic and mechanical equipment. The physical embodiment also detects attempts at physical probing or intruding, through the use of a variety of electro-mechanical sensing devices. Also, the physical embodiment of the cryptographic facility 30 provides for the zeroization of all internally stored secret cryptographic variables. Such zeroization is done automatically whenever an attempted probing or intrusion has been detected. The physical embodiment also provides a manual facility for a zeroization of internally stored secret cryptographic variables. Reference to the Abraham, et al. patent application cited above, will give an example of how such physical security features can be implemented.

Figure 4:
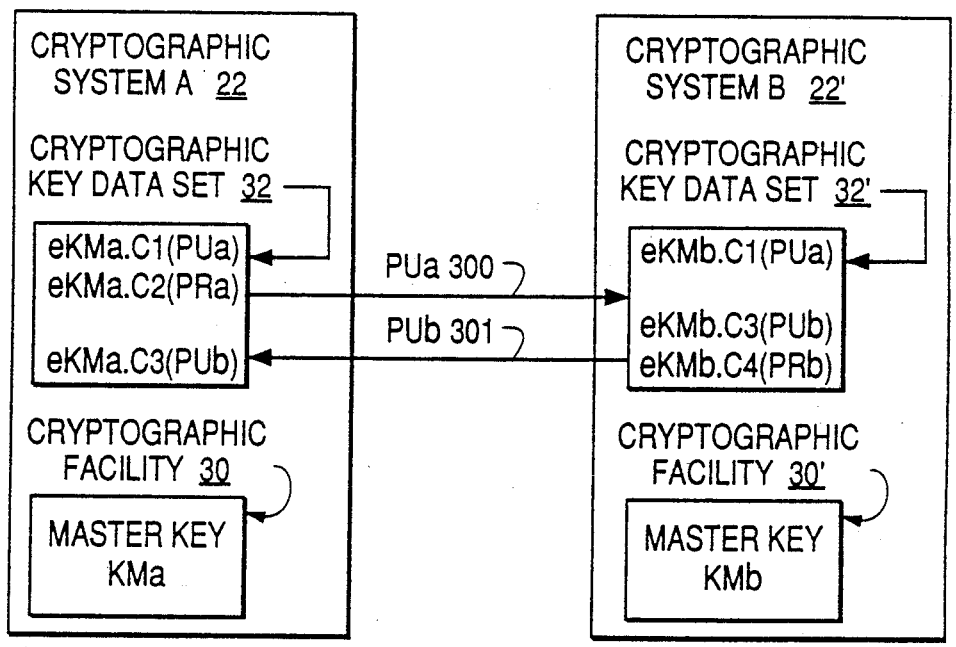
FIG. 4 is a block diagram showing the public and private keys that must first be initialized at two cryptographic systems A and B in order that they may electronically distribute DEA keys using a public key algorithm.

Initialization of Public-Key Cryptographic System: FIG. 4 illustrates two cryptographic systems, A and B, that wish to communicate cryptographically using public key cryptography. Cryptographic system A generates a public and private key pair (PUa, PRa), where PUa is the public key of A and PRa is the private key of A. In like manner, cryptographic system B generates a public and private key pair (PUb, PRb), where PUb is the public key of B and PRb is the private key of B.

Referring to FIG. 4, the cryptographic facility 30 of cryptographic system A contains a master key KMa and the cryptographic facility 30' of cryptographic system B contains a master key KMb. KMa and KMb are ordinarily different, being equal only by mere chance. At cryptographic system A, the public key PUa is encrypted with the Data Encryption algorithm (DEA) using variant key KMa.C1 to form the encrypted value eKMa.C1(PUa), where KMa.C1 is formed as the Exclusive OR product of master key KMa and control vector C1. Likewise, at cryptographic system A, the private key PRa is encrypted with the DEA using variant key KMa.C2 to form the encrypted value eKMa.C2(PRa), where KMa.C2 is formed as the Exclusive OR product of master key KMa and control vector C2. The symbol "." denotes the Exclusive OR operation. The encrypted values eKMa.C1(PUa) and eKMa.C2(PRa) are stored in cryptographic key data set 32.

Figure 11:
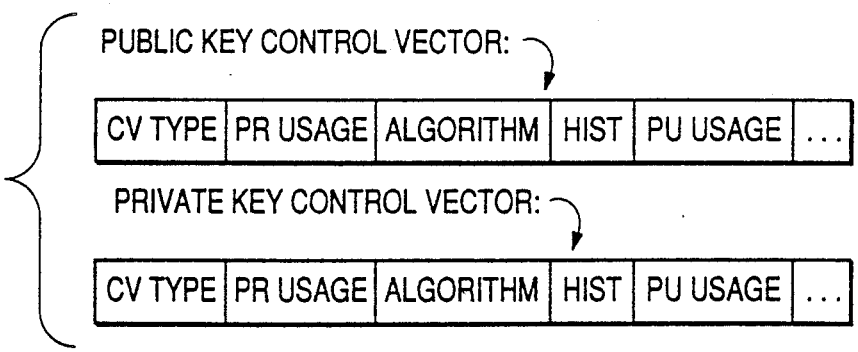
FIG. 11 is a block diagram of control vectors for public and private keys used for key distribution (i.e., key management purposes).

The control vector specifies whether the key is a public or private key and contains other key usage control information specifying how the key may be used. For example, when the encrypted key eKMa.C2(PRa) is decrypted for use within the cryptographic facility 30, control vector C2 indicates to the cryptographic facility how and in what way the key PRa may be used. Control vector C1 similarly controls the use of public key PUa. The use of the control vector to control key usage is described in U.S. Pat. Nos. 4,850,017, 4,941,176, 4,918,176, 4,924,514, 4924,515, and 5,007,089 cited in the background art and in co-pending U.S. Pat. application Ser. No. 07/602,989 also cited in the background art. FIG. 11 illustrates control vectors that define public and private keys, where the public and private keys are key management keys used by the cryptographic system to distribute DEA keys. The fields in each control vector consist of a CV TYPE, which specifies whether the control vector is a public or a private key and additionally whether the key pair is a key management key pair for use in distributing DEA keys or whether the key pair is some other kind of key pair. Other types of key pairs are possible, such as user keys which can be used for generation and verification of digital signatures but not for key distribution. Each control vector has a PR USAGE and PU USAGE field. For the public key control vector, the PU USAGE field controls the usage of the public key in cryptographic instructions whereas the PR USAGE field is only informational. For the private key control vector, the PR USAGE field controls the usage of the private key in cryptographic instructions whereas the PU USAGE field is only informational. The ALGORITHM field indicates the public key algorithm to which this key pair pertains. The HIST field records history information, e.g., the options used to import a public key (see co-pending patent application serial number 07/602,989 as cited in the background art, which describes the use of history information fields in the public key control vector). The reader will appreciate that the control vector may contain a variety of different control vector fields for the purpose of controlling the operation and use of the key within the cryptographic network and cryptographic systems within the network.

In an alternate embodiment, the public key PUa may be stored in an unencrypted form, since there is no intent to keep the value of this key secret. Encrypting PUa is done for sake of uniformity, so that all keys in the cryptographic key data set 32 are stored and recovered using one common method. Those skilled in the art will also recognize that the length of PUa and PRa will likely be different than the block size of the DEA, which is 64 bits, and hence PUa and PRa may need to be encrypted in separate 64-bit pieces. The particular method for encrypting PUa and PRa is unimportant to the invention. However, one way that this encryption can be carried out is to use the Cipher Block Chaining (CBC) mode of DEA encryption described in DES modes of operation, Federal Information Processing Standards Publication 81, National Bureau of Standards, US Department of Commerce, Dec. 1980. In cases where KMa is a 128-bit key, the CBC mode of DEA encryption can be adapted to encrypt PUa under KMa. PUa is first encrypted with the leftmost 64 bits of KMa, then decrypted with the rightmost 64 bits of KMa, and then encrypted again with the leftmost 64 bits of KMa.

In like manner, at cryptographic system B, the public and private keys, PUb and PRb, are encrypted with master key KMb and control vectors C3 and C4, per the same method described for cryptographic system A. The encrypted values eKMb.C3(PUb) and eKMb.C4(PRb) are stored in cryptographic key data set 32'. Control vectors C3 and C4 control the usage of PUb and PRb, respectively.

Although encryption of the public and private keys has been described in terms of a DEA-based master key; those skilled in the art will appreciate that the DEA could be replaced by a public key algorithm and the master keys could be replaced by a PKA-based key pair used for this purpose. Moreover, the encryption of the public and private keys has been described in terms of encryption of the keys only. In some implementations it may be more practical to imbed these keys within key records that contain other key-related information besides the keys themselves.

In order for cryptographic systems A and B to carry out cryptographic operations using their respective implemented public key algorithms, they must share their public keys with each other. Thus, at cryptographic system A a function exists that permits the encrypted value eKMa.Cl(PUa) to be accessed from cryptographic key data set 32 and decrypted so that the clear value of PUa may be exported to cryptographic system B at 300. At cryptographic system B a function exists that permits the clear value of PUa to be imported and encrypted under the variant key KMb.Cl. The so-imported encrypted value eKMb.Cl(PUa) is then stored in cryptographic key data set 32'. In like manner, functions exist at B and A that permit public key PUb to be decrypted at B, sent to A at 301, and re-encrypted at A for storage in A's cryptographic key data set.

Co-pending patent application by S. M. Matyas et al., U.S. Pat. application Ser. No. 07/602,989, "Method and Apparatus for Controlling the use of a Public Key, Based on the Level of Import Integrity for the Key," describes a method for generating public and private keys and for distributing public keys in order to initialize a public-key cryptographic system, and is incorporated by reference herein.

Figure 5:
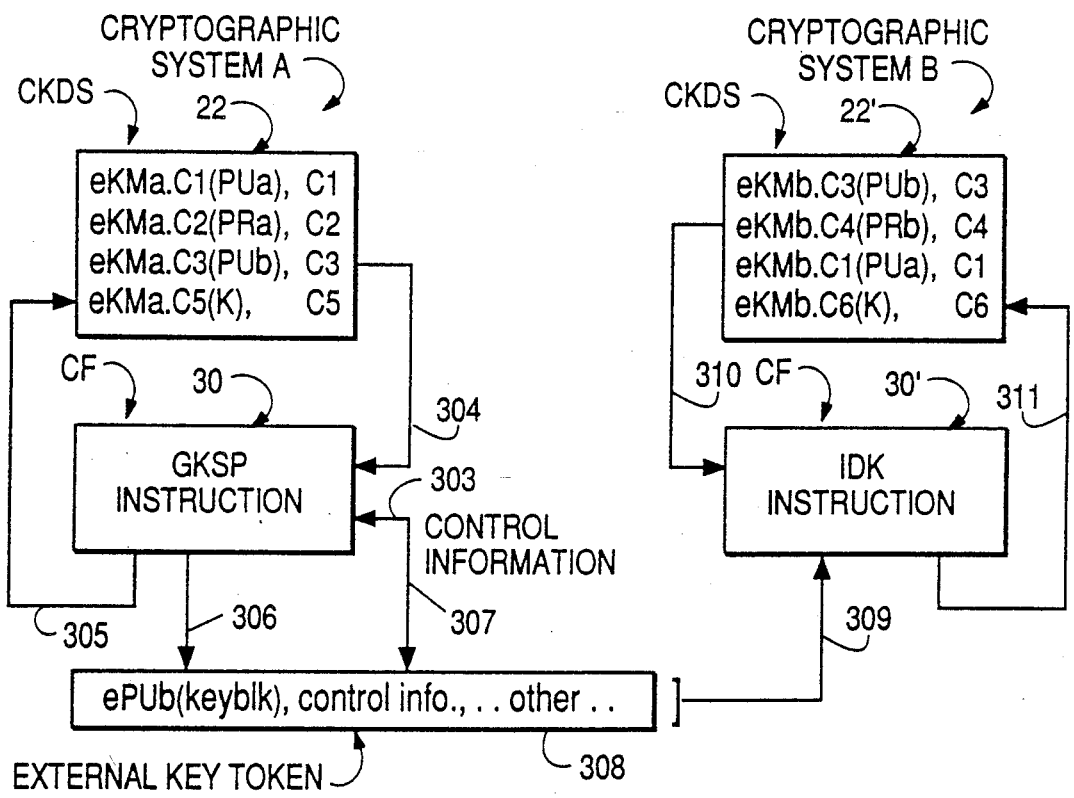
FIG. 5 is a block diagram illustrating DEA key distribution using the GKSP and IDK instructions without digital signatures.

Key Distribution: FIG. 5 illustrates the process by which cryptographic system A may distribute a key to cryptographic system B using a public key algorithm (PKA). That is, it illustrates the process of key distribution using a PKA. In a hybrid key distribution scheme, the distributed key is a DEA key, e.g., an initial key-encrypting key to be used later with a DEA-based key distribution scheme to distribute all subsequent DEA keys. However, any key can be distributed using the so-described PKA-based key distribution scheme, including both DEA keys and PKA keys. The distributed DEA and PKA keys can be of any type or designated use. However, for purposes of illustration, FIG. 5 shall assume that the distributed key is a DEA key.

Figure 6:
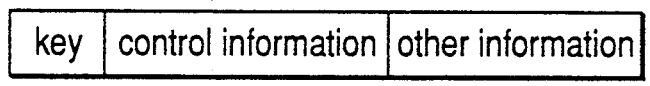
FIG. 6 is a block diagram of a key block.

Referring to FIG. 5, the steps involved in distribution of a key from cryptographic system A to cryptographic system B are these. At cryptographic system A, a Generate Key Set PKA (GKSP) instruction is executed within the CF 30. Control information at 303 is provided to the GKSP instruction as input. In response, the GKSP instruction generates a key K and produces two encrypted copies of K, which are returned by the GKSP instruction at 305 and 306. The first encrypted copy of K is produced by encrypting K with the DEA using variant key KMa.C5 formed as the Exclusive OR product of master key KMa and control vector C5. C5 may be input to the GKSP instruction as part of the control information, at 303, or it may be produced within the CF 30 as part of the GKSP instruction, or it may be produced as a combination of both methods. The second encrypted copy of K is produced as follows. A key block (designated keyblk) is first formed. The key block includes the clear value of K, control information, and possibly other information unimportant to the present discussion, as illustrated in FIG. 6. The format of the keyblk is unimportant to the present discussion, and those skilled in the art will recognize that many possible arrangements of the keyblk information are possible. In all cases, the keyblk contains the necessary information to accomplish the task of key distribution. The length of the keyblk is assumed to be equal to the block size of the public key algorithm. For example, if the public key algorithm is the RSA algorithm, then the block size is just the modulus length. Also, it is assumed that the numeric value of the keyblk, say its binary value, is adjusted as necessary to permit it to be encrypted as a single block by the public key algorithm. For example, if the public key algorithm is the RSA algorithm, then the keyblk is adjusted so that its binary value is less than the binary value of the modulus. This can be done by forcing the high order (most significant) bit in the keyblk to zero. Once the keyblk has been formatted, it is encrypted with the public key PUb of cryptographic system B to form the encrypted value ePUb(keyblk), which is returned at 306. To permit this to be accomplished, the encrypted value eKMa.C3(PUb) and control vector C3 are supplied to the GKSP instruction at 304 as inputs and eKMa.C3(PUb) is decrypted under variant key KMa.C3. KMa.C3 is formed as the Exclusive OR product of master key KMa stored within the CF 30 and control vector C3.

The first encrypted output eKMa.C5(K) at 305 is stored in the cryptographic key data set 22 of cryptographic system A. Control vector C5 is also stored in the cryptographic key data set 22 together with the encrypted key eKMa.C5(K). In some implementations it may be convenient to store eKMa.C5(K) and C5 in an internal key token together with other key-related information. The internal key token is not relevant to the present discussion, and is therefore not shown in FIG. 5. If C5 is generated within the CF 30, it may also be provided as an output at 305 so that it may be store in CKDS 22.

Figure 7:
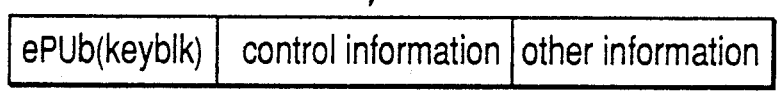
FIG. 7 is a block diagram of an external key token.

The second encrypted output ePUb(keyblk) at 306 is formatted within an external key token 308. The external key token contains the encrypted key or encrypted key block ePUb(keyblk), control information, and other information unimportant to the present discussion, as shown in FIG. 7. The control information supplied as input to the GKSP instruction at 303 is also stored in external key token 308 at 307. However, the control information at 307 may include additional information available to the cryptographic facility access program (CFAP) which is not specified as an input to the GKSP instruction at 303. In other words, the source of the control information in the external key token 308 may be much broader than the control information supplied as input the the GKSP instruction at 303. One example, is the Environment Identifier (EID) value stored both in the CF 30 and in the CFAP. The EID value is an identifier that uniquely identifies each cryptographic facility or cryptographic system within a network. The EID value is loaded into the CF 30 during an initialization sequence prior to performing routine cryptographic operations within the cryptographic system. Another example of initialization is the loading of the master key KMa. The EID value need not be supplied to the CF since it is already stored in the CF. But the EID value may be stored within the external key token, in which case it is supplied as an input at 307. In like manner, the control information in the keyblk may include a control vector C6 specifying the usage of K at cryptographic system B. In that case, C6 may be supplied as part of the control information at 303, in which case it is also supplied as part of the control information at 307. If however C6 is generated within CF 30, then C6 is not supplied as part of the control information at 303, but is supplied as part of the control information at 307. Those skilled in the art will recognize that various alternatives exist for the specification or derivation of the necessary control information and that different combinations of inputs to the GKSP instruction and to the external key token are therefore possible.

The formatted external key token 308 is transmitted to cryptographic system B where it is processed. The CFAP at B first checks the control information in the external key token for consistency. For example, if the control information contains a control vector C6, then C6 is checked to ensure that it represents a key type and key usage approved by cryptographic system B. Likewise, if the control information contains an EID value, then the EID value is checked to ensure that the external key token and the key to be imported originated from cryptographic system A, i.e., it originated from the expected or anticipated cryptographic system that B "thinks" it is in communication with and which it desires to establish a keying relationship. Once this has been accomplished, the received key is imported as follows. The encrypted keyblk, ePUb(keyblk) and part or all of the control information in the external key token are supplied as inputs to an Import DEA Key [IDK] instruction at 309, which is executed within CF 30′ at cryptographic system B. In response, the IDK instruction decrypts ePUb(keyblk) under the private key PRb belonging to cryptographic system B. To permit this to be accomplished, the encrypted value eKMb.C4(PRb) and control vector C4 are supplied to the IDK instruction at 310 as inputs and eKMb.C4(PRb) is decrypted under variant key KMb.C4. KMb.C4 is formed as the Exclusive OR product of master key KMb stored within the CF 30′ and control vector C4. Once ePUb(keyblk) has been decrypted and the clear value of keyblk has been recovered, the keyblk is processed as follows. The control information contained in the keyblk is checked for consistency against the control information, or reference control information, supplied as input at 309. If the consistency checking is satisfactory (okay), then the clear value of K is extracted from keyblk and it is encrypted with the variant key KMb.C6 to produce the encrypted key value eKMb.C6(K). KMb.C6 is formed as the Exclusive OR product of master key KMb stored within CF 30′ and control vector C6. Control vector C6 may be obtained in different ways. C6 may be contained in the control information in keyblk, in which case it is extracted from keyblk. In other cases, C6 may be produced within CF 30′. For example, if there is only one key type and key usage permitted, then C6 can be a constant stored within the IDK instruction. The so-produced encrypted key value eKMb.C6(K) is provided as an output of the IDK instruction at 311, and is stored together with its control vector C6 within CKDS 22′. The value of C6 stored in CKDS 22′ is obtained either from the control information input to the IDK instruction at 309 or, if C6 is not in the control information input to the IDK instruction at 309, then it is produced by the CFAP in the same way that it is produced by the IDK instruction and stored in CKDS 22′. Alternatively, C6 could be returned as an output of the IDK instruction. Those skilled in the art will realize that several alternatives exist for obtaining C6 depending on how and where it is produced within the cryptographic system and whether it is or is not included as part of the control information in the external key token.

In the preferred embodiment, the control information at 303 supplied to the GKSP instruction includes a specification of control vectors C5 and C6. This allows the GKSP instruction the freedom and flexibility to generate two encrypted copies of key K that have different key types and usages, as specified by C5 and C6. In that case, the GKSP instruction must incorporate some control vector checking to determine that C5 and C6 constitutes a valid pair. The various options for control vector design and checking pursued here are based on the control vector designs included in prior art, cited in the background art, and already discussed. Likewise, in the preferred embodiment, control vector C6 is included in the control information in the key block (keyblk) and also in the control information in the external key token. This permits the receiving cryptographic system to import keys of different types while still permitting the receiving system to verify that the imported key is one that it wants or expects. This is accomplished by the CFAP first checking the control vector in the external key token to make sure that it prescribes a key type and key usage that it expects or will allow to be imported. C6 is then supplied as an input in the control information at 309 to the CF 30′. At the time the IDK instruction recovers the clear value of keyblk, the value of C6 in the control information in keyblk is checked against the value of C6, or the reference value of C6, supplied as input. This permits the CF to verify that the value of C6 used to import the key K is the same control vector C6 in the external key token. Otherwise, if this check was ignored it would be possible for an adversary to substitute C6′ for C6 in the external key token, causing a key to be imported that the CFAP may not permit.

In the preferred embodiment, each cryptographic facility stores a unique EID value, e.g., a 128-bit value set within the CF during an initialization sequence before routine operations are permitted. At the time a keyblk is prepared within the CF by a GKSP instruction, the EID value is obtained from the CF and included within the control information in the keyblk. In like manner, a duplicate copy of the EID value is stored outside the CF with integrity such that it is available to the CFAP. This EID value is obtained by the CFAP and is included within the control information in the external key token. Thus, the CFAP at the receiving cryptographic system can check the EID value in the control information of the received external key token to ensure that the external key token originated from the cryptographic system that is expected or anticipated. That is, B knows that the external key token came from A, which is what is expected. The EID value is also supplied as part of the control information at 309. Thus, when the IDK instruction obtains the clear keyblk, the EID value in the control information in the clear keyblk can be checked against the EID value, or reference EID value, supplied as an input. In this way, the CFAP is sure that the IDK instruction will import K only if the two EID values are equal. This prevents an adversary from changing the EID value in the external key token to a different value that might also be accepted by the receiving device. This might lead to a situation where B imports a key from A, thinking that it came from C.

The EID also serves another purpose, as now described. At the time the clear value of keyblk is obtained by the IDK instruction, a check is performed to ensure that the value of EID in the control information in keyblk is not equal to the value of EID stored in the CF at the receiving device. Thus, the encrypted value of ePUx(keyblk) produced at cryptographic system A, where PUx may be the public key of any cryptographic system in the network, including A itself, cannot be imported by A. This prevents an adversary at A, who specifies his own public key PUa to the GKSP instruction, from importing ePUa(keyblk) at A and thereby obtaining two encrypted copies eKMa.C5(K) and eKMa.C6(K) of the same key with potentially different key types and key usage attributes. In some cases, bifunctional key pairs are undesirable and the key management design will specifically disallow such key pairs to be created using the key generation facilities provided by the key management services.

Key Distribution with Digital Signatures: The key distribution scheme described in FIG. 5 is not by itself the preferred embodiment of the invention. This is so because, as it stands, the scheme can be attacked by an adversary who knows the public value of B's key, PUb. In public key cryptographic systems, one naturally makes the assumption that PUb is known by anyone, even an adversary. The adversary can forge values of keyblk containing DEA keys of his choosing and freely encrypt these key blocks under PUb. Thus, at B, there is no way to know that an imported key originated with A or with an adversary posing as A. The importing function will import the forged values of keyblk, which results in known values of K being encrypted under the master key, of the form eKMb.C6(K), and stored in CKDS 22'. In that case, data or keys encrypted under K are easily deciphered by the adversary who knows K.

The preferred embodiment of the invention therefore includes a means by which the receiver, say cryptographic system B, can ensure that a received encrypted keyblk of the form ePUb(keyblk) did in fact originate with the intended sender, say cryptographic system A. To accomplish this, the GKSP instruction at cryptographic system A produces a digital signature (designated DSIGa) on ePUb(keyblk) using its private key PRa. The so-produced digital signature is transmitted together with the external key token to cryptographic system B where the key is imported using an IDK instruction. In this case, the IDK instruction first verifies the digital signature DSIGa using the previously imported copy of PUa received from cryptographic system A. Only after DSIGa has been successfully verified will the IDK instruction continues as already described in FIG. 5 and import the key K.

Figure 8:
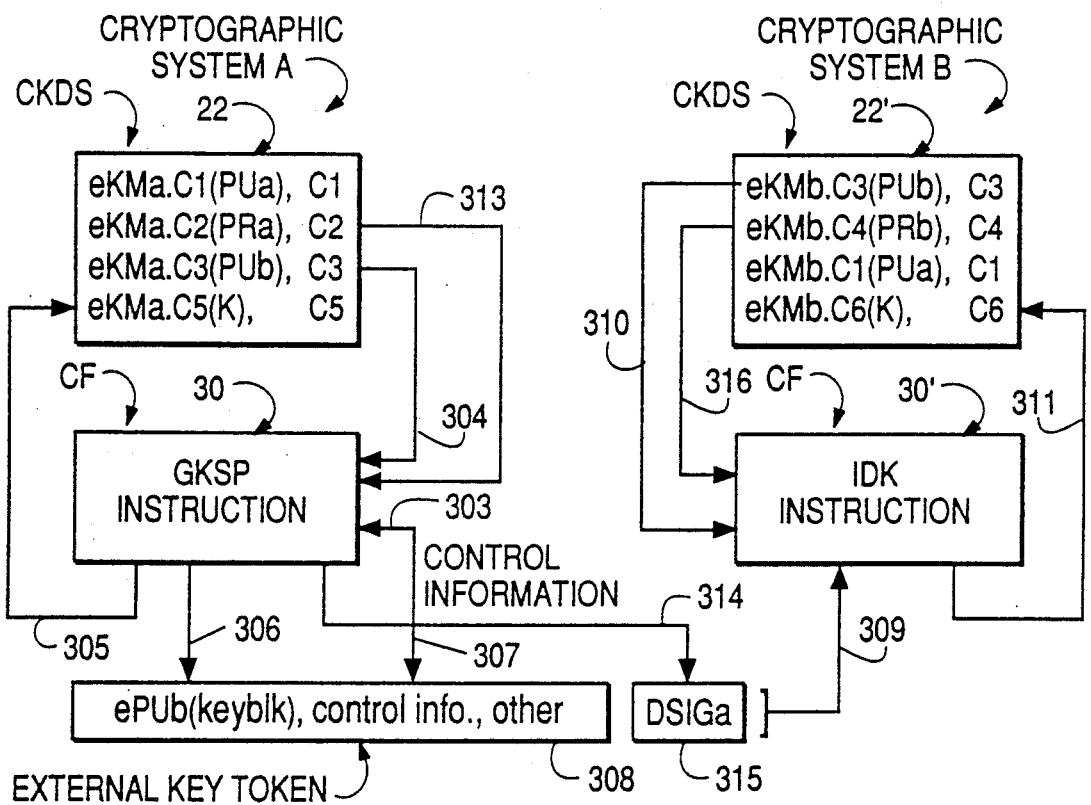
FIG. 8 is a block diagram illustrating DEA key distribution using the GKSP and IDK instructions with digital signatures.

FIG. 8 illustrates the scheme for DEA key distribution with digital signatures, which is the same as the scheme shown in FIG. 5 except as follows. Once the encrypted key value ePUb(keyblk) has been produced, the GKSP instruction additionally produces the digital signature DSIGa from ePUb(keyblk) and the private key PRa belonging to cryptographic system A. A common method for producing such a signature is to first calculate a hash value on ePUb(keyblk) using a one way cryptographic function, such as described in U.S. Pat. No. 4,908,861 by Brachtl et al., cited in the background art, which uses either two DEA encryptions or four DEA encryptions per each 64 bits of input text to be hashed, and then decrypt (or transform) the hash value using the private key PRa to produce a DSIGa of the form dPRa(hash value). The clear value of PRa is obtained by decrypting the encrypted value of eKMa.C2(-PRa) supplied as an input to the GKSP instruction at 313 using the DEA and the variant key KMa.C2. KMa.C2 is formed as the Exclusive OR product of master key KMa stored in CF 30 and control vector C2 supplied as input to the GKSP instruction at 313. For example, if the public key algorithm is the RSA algorithm, a the digital signature may be calculated using the method as described in ISO Draft International Standard 9796 entitled "Information Technology ΣSecurity Techniques ΣDigital Signature Scheme Giving Message Recovery." The so-produced DSIGa 315 is returned as an output at 314. Both the external key token 308 and the DSIGa 315 are transmitted to cryptographic system B. At cryptographic system B, the IDK instruction is used to import the key K in similar fashion as described in FIG. 5 except that the IDK instruction first validates DSIGa using the public key PUa previously imported, encrypted, and stored in CKDS 22'. A DSIGa of the form dPRa(hash value) is validated by encrypting dPRa(hash value) with PUa, calculating a hash value on ePUb(keyblk) using the same one way cryptographic function, called the hash value of reference, and comparing the hash value of reference and the recovered clear hash value for equality. Only if this comparison check is successful does the IDK instruction continue and import the key K. The clear value of PUa is obtained by decrypting the encrypted value of eKMb.Cl(PUa) supplied as an input to the IDK instruction at 316 using the DEA and the variant key KMb.Cl. KMb.Cl is formed as the Exclusive OR product of master key KMb stored in CF 30' and control vector Cl supplied as input to the IDK instruction at 316. Thus, the GKSP instruction at cryptographic system A produces DSIGa and the IDK instruction at cryptographic system B verifies DSIGa. In an alternate embodiment, DSIGa can be calculated by the CF 30 using a separate instruction for generating digital signatures. In that case, after the GKSP instruction has been executed, the CFAP invokes the generate digital signature instruction causing DSIGa to be generated.

In like manner, DSIGa can be verified by the CF 30' using a separate instruction for verifying digital signatures. In that case, before the IDK instruction is invoked, the CFAP invokes the verify digital signature instruction to ensure that DSIGa is valid.

Figure 9:
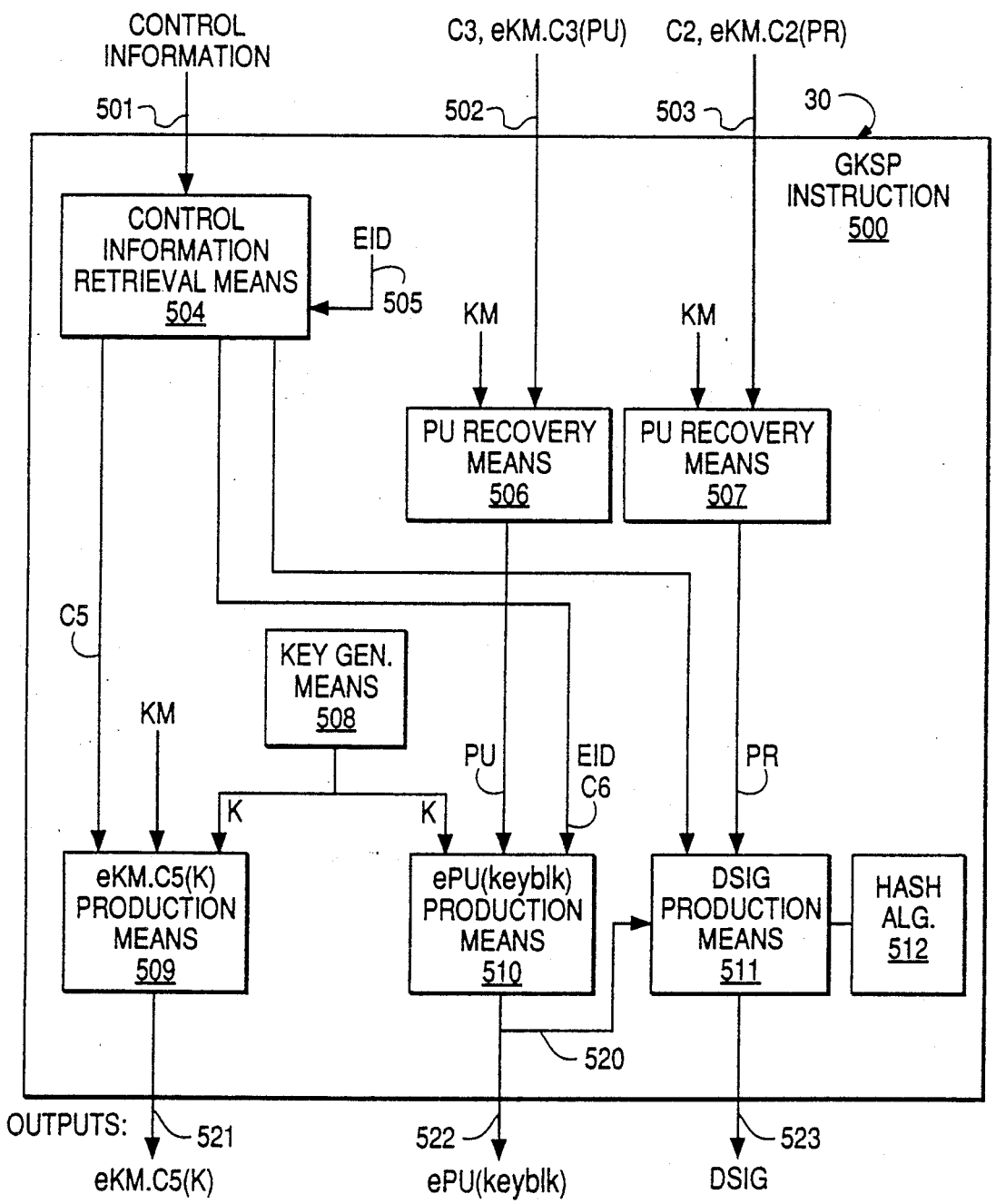
FIG. 9 is a block diagram of the Generate Key Set PKA (GKSP) instruction.

Generate Key Set PKA (GKSP) Instruction: FIG. 9 illustrates the Generate Key Set PKA (GKSP) instruction. The GKSP instruction of FIG. 9 is identical to the GKSP instruction contained within the CF 30 of FIG. 8. The GKSP instruction generates a two encrypted copies of a generated DEA key K. The first copy is of the form eKM.C5(K) and is stored in the cryptographic key data set of the generating cryptographic device, say A. The second copy is of the form ePU(keyblk) and is transmitted to a designated receiving cryptographic device, say B, where the public key PU belonging to the receiving cryptographic device B. Also, the GKSP instruction produces a digital signature DSIG on ePU(keyblk) using the private key PR of the generating cryptographic device A. DSIG is also transmitted to cryptographic device B to serve as proof that ePU(keyblk) was produced at cryptographic device A, i.e., produce at a valid network cryptographic device.

Referring to FIG. 9, GKSP instruction 500 consists of control information retrieval means 504, PU recovery means 506, PR recovery means 507, key generation means 508, eKM.C5(K) production means 509, ePU(keyblk) production means 510, DSIG production means 511, and hash algorithms 512. GKSP instruction 500 is located in instruction processor 142 within cryptographic facility 30, as shown in FIG. 3. The inputs to the GKSP instruction are supplied to the GKSP instruction by CFAP 34, i.e., by the CFAP 34 to the CF 30 across the CFAP-to-CF interface. In similar manner, the outputs from the GKSP instruction are supplied to the CFAP 34, i.e., by the CF 30 to the CFAP 34 across the CFAP-to-CF interface.

The inputs to GKSP instruction 500 are (1) at 501, control information such as control vectors C5 and C6 that specify the key usage attributes of the two encrypted copies of the generated DEA key K, (2) at 502, control vector C3 and encrypted public key eKM.C3(PU), where C3 specifies the key usage attributes of public key PU belonging to the receiving cryptographic device, and (3) at 503, control vector C2 and encrypted private key eKM.C2(PR), where C2 specifies the key usage attributes of private key PR belonging to the sending or generating cryptographic device. The outputs from GKSP instruction 500 are (1) at 521, the encrypted key, eKM.C5(K), where K is encrypted under variant key KM.C5 formed as the Exclusive OR product of master key KM and control vector C5, (2) at 522, the encrypted key block, ePU(keyblk), where keyblk is encrypted under public key PU belonging to the intended receiving cryptographic device and where keyblk is a key block containing the generated DEA key K, control information, and possibly other information as depicted in FIG. 6, and (3), at 523, a digital signature DSIG generated on ePU(keyblk) using the private key PR belonging to the sending or generating cryptographic device.

Control information retrieval means 504 accepts and parses control information supplied as input to the GKSP instruction at 501. Also, control information retrieval means 504 accesses control information stored within the secure boundary of the cryptographic facility, e.g., the Environment Identifier (EID) at 505. Control information retrieval means 504 may also perform consistency checking on the assembled control information. For example, control vectors C5 and C6 may be checked and cross checked for consistency, i.e., to ensure they are a valid control vector pair. GKSP instruction 500 is aborted if C5 and C6 are incorrect or do not specify the correct key usage required by the GKSP instruction. In an alternate embodiment, it may be possible for control information retrieval means 504 to generate or produce control vector C6 from control vector C5, or vice versa, in which case only one control vector is specified in the control information supplied at 501. In that case, cross checking of C5 and C6 is unnecessary. Control vector checking of C5 or C6 can be performed in control information retrieval means 504 or in eKM.C5(K) production means 509 if the control vector is C5 or in ePU(keyblk) production means 510 if the control vector is C6. The reader will appreciate that control vector checking may be accomplished in variety of ways within the different components parts of the GKSP instruction, and that these variations do not significantly depart of the general framework of the invention. In any event, control information retrieval means 504 makes the control information available to other component parts of the GKSP instruction. C5 is passed to eKM.C5(K) production means 509 and EID and C6 are passed to ePU(keyblk) production means 510. Optionally, control information may also be passed to DSIG production means 511 such as the identifier or name of a hashing algorithm to be used in the preparation of the digital signature. The GKSP instruction may support only one hashing algorithm in which case the identifier or name of a hashing algorithm need not be passed to DSIG production means. Those skilled in the art will recognize that many possible variations exist for inputting and accessing control information, for parsing, checking and making the control information available to different component parts of the GKSP instruction.

PU recovery means 506 decrypts input eKM.C3(PU) under variant key KM.C3 formed as the Exclusive OR product of master key KM stored in clear form within the cryptographic facility and directly accessible to GKSP instruction 500 and control vector C3 specified as an input to GKSP instruction 500. Prior to decrypting eKM.C3(PU), PU recovery means 506 performs control vector checking on C3. GKSP instruction 500 is aborted if C3 is incorrect or does not specify the correct key usage required by the GKSP instruction. Public key PU is stored in encrypted form so that PU Recovery means 506 will be, for all practical purposes, identical to PR Recovery means 507. Encryption of PU is also preferred since it permits control vector C3 to be cryptographically coupled with public key PU. Even though PU is public, and there is no need to protect the secrecy of PU, encryption of PU thus ensures that PU can be used only if C3 is correctly specified as an input to the GKSP instruction. This ensures that PU is used by the GKSP instruction only if it has been so designated for use. In an alternate embodiment, PU could be stored outside the cryptographic facility in clear form and PU Recovery means 506 could be omitted from GKSP instruction 500. In this case, the embodiment may choose to fix the usage attributes of PU so that there is no chance for an adversary to specify a control vector C3 that is incorrect, i.e., C3 is a fixed constant value. In any event, the recovered clear value of PU is supplied as an input to ePU(keyblk) production means 510.

PR recovery means 507 decrypts input eKM.C2(PR) under variant key KM.C2 formed as the Exclusive OR product of master key KM stored in clear form within the cryptographic facility and directly accessible to GKSP instruction 500. Prior to decrypting eKM.C2(PR), PR recovery means 507 performs control vector checking on C2. GKSP instruction 500 is aborted if C2 is incorrect or does not specify the correct key usage required by the GKSP instruction. The recovered clear value of PR is supplied as an input to DSIG production means 511.

Key generator means 508 is a pseudo random number generator for generating DEA keys. Alternatively, key generator means 508 could be a true random number generator. For sake of simplicity, key generator means 508 generates 64-bit random numbers which are adjusted for odd parity. That is, the eight bit of each byte in the generated random number is adjusted so that the value in each byte is odd. DEA keys may contain either 64 or 128 bits depending on their intended 64-bit keys. Key-encrypting-keys used for encrypting keys are generally 128-bit keys, but may in some cases be 64-bit keys. To produce a 128-bit key, key generator means 508 is invoked twice. The so-generated DEA key is supplied as an input to both eKM.C5(K) production means 509 and ePU(keyblk) production means 510.

eKM.C5(K) production means 509 Exclusive ORs input KM and C5 to produce variant key KM.C5 and then encrypts input K with KM.C5 to form the encrypted output eKM.C5(K), which is returned to the CFAP at 521. If control vector C5 is not consistency checked in control information retrieval means, it may alternatively be checked here.

ePU(keyblk) production means 510 first prepares a key block, designated keyblk, from the inputs K, EID, and C6, and then encrypts keyblk with public key PU to form the encrypted output ePU(keyblk), which is returned to the CFAP at 522. If control vector C6 is not consistency checked in control information retrieval means, it may alternatively be checked here. The value ePU(keyblk) is also supplied as an input to DSIG production means 511 to allow the digital signature DSIG to be produced. The format of keyblk is shown in FIG. 6 and has been discussed previously. The procedure of preparing keyblk accomplishes two main goals. It ensures that all necessary information such as the key, control information, key-related information, keyblk parsing information, etc. is included within keyblk. Also, it ensure that keyblk is constructed in a way that keyblk can be encrypted with PU using the public key algorithm. For example, it may be necessary to pad keyblk so that its length and binary value are such that keyblk is encrypted properly and in conformance with restrictions imposed or that may be imposed by the public key algorithm.

DSIG production means 511 produces a digital signature on ePU(keyblk) using private key PR. To accomplish this, a hash value is first calculated on ePU(keyblk) using hash algorithm 512. Hash algorithm 512 may in fact be a set of hash algorithms. In that case, the hash algorithm is selected on the basis of a hash algorithm identifier or other appropriate encoded value passed by the control information retrieval means 504 to the DSIG production means 511. The so-produced hash value is then formatted in a suitable signature block and decrypted with private key PR to produce DSIG, which is returned to the CFAP at 523. The signature block can in the simplest case consist of the hash value and padding data, so as to construct a signature block whose length and value are in conformance with restrictions imposed or that may be imposed by the public key algorithm, as already discussed above. The DSIG production means 511 may also implement a digital signature method based on a national or international standard, such as International Standards Organization draft international standard (ISO DIS) 9796.

Figure 10:
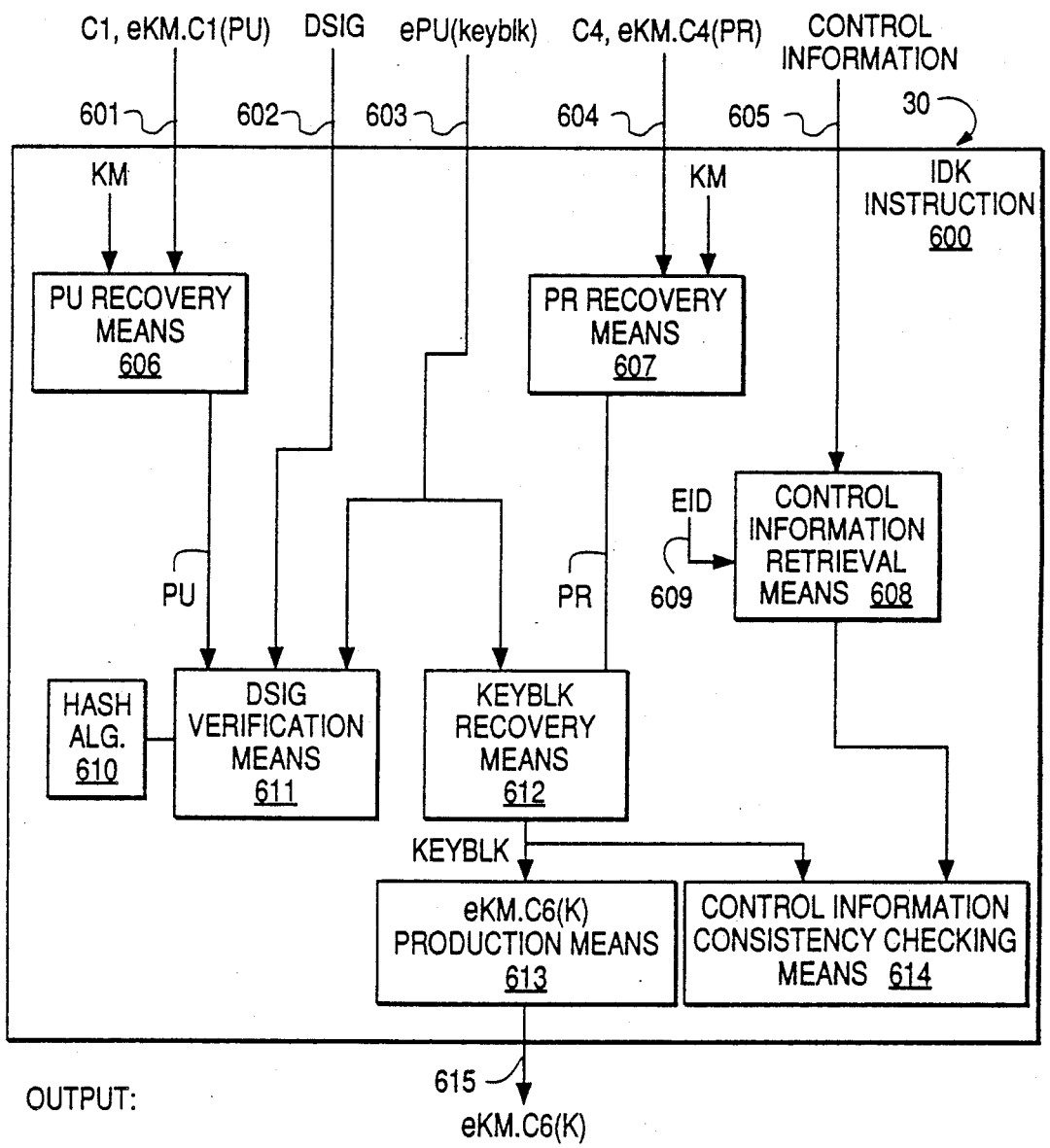
FIG. 10 is a block diagram of the Import DEA Key (IDK) instruction.

Import DEA Key (IDK) Instruction: FIG. 10 illustrates the Import DEA Key (IDK) instruction. The IDK instruction of FIG. 10 is identical to the IDK instruction contained within the CF 30 of FIG. 9 The IDK instruction permits a cryptographic device, say B, to import an encrypted DEA key of the form ePU(keyblk) that has been received from a sending cryptographic device, say A. The received digital signature DSIG is used by the IDK instruction to verify that ePU(keyblk) originated with cryptographic device A, i.e., at a valid network cryptographic device.

Referring to FIG. 10, IDK instruction 600 consists of PU recovery means 606, PR recovery means 607, control information retrieval means 608, hash algorithms 610, DSIG verification means 611, keyblk recovery means 612, eKM.C6(K) production means 613, and control information consistency checking means 614. IDK instruction 600 is located in instruction processor 142 within cryptographic facility 30, as shown in FIG. 3. The inputs to the IDK instruction are supplied to the IDK instruction by CFAP 34, i.e., by the CFAP 34 to the CF 30 across the CFAP-to-CF interface. In similar manner, the outputs from the IDK instruction are supplied to the CFAP 34, i.e., by the CF 30 to the CFAP 34 across the CFAP-to-CF interface.

The inputs to the IDK instruction 600 are (1) at 601, control vector Cl and encrypted public key eKM.Cl-(PU), where Cl specifies the key usage attributes of public key PU belonging to the sending cryptographic device, (2) at 602, digital signature DSIG, (3) at 603, encrypted key block ePU(keyblk), where keyblk is encrypted under public key PU belonging to the the receiving cryptographic device and where keyblk is a key block containing the to-be-imported DEA key K, control information, and possibly other information as depicted in FIG. 6, (4) at 604, control vector C4 and encrypted private key eKM.C4(PR), where C4 specifies the key usage attributes of private key PR belonging to the receiving cryptographic device, and (5) at 605, control information, such as a reference control vector C6 and a reference EID value of the sending cryptographic device. The output of the IDK instruction 600 is the encrypted key eKM.C6(K), where K is the to-be-imported DEA key encrypted under variant key KM.C6 formed as the Exclusive OR product of master key KM and control vector C6.

PU recovery means 606 decrypts input eKM.Cl(PU) under variant key KM.Cl formed as the Exclusive OR product of master key KM stored in clear form within the cryptographic facility and directly accessible to IDK instruction 600 and control vector Cl specified as an input to IDK instruction 600. Prior to decrypting eKM.Cl(PU), PU recovery means 606 performs control vector checking on Cl. IDK instruction 600 is aborted if C1 is incorrect or does not specify the correct key usage required by the IKK instruction. Public key PU is stored in encrypted form so that PU recovery means 606 well be, for all practical purposes, identical to PR recovery means 607 Encryption of PU is also preferred since it permits control vector Cl to be cryptographically coupled with public key PU, as argued previously under the description of the GKSP instruction. In an alternate embodiment, PU could be stored outside the cryptographic facility in clear form and PU recovery means 606 could be omitted from IDK instruction 600. In this case, the embodiment may choose to fix the usage attributes of PU so that there is no chance for an adversary to specify a control vector C1 that is incorrect, i.e., C181122 is a fixed constant value. In any event, the recovered clear value of PU is supplied as an input to DISG verification means 611.

PR recovery means 607 decrypts input eKM.C4(PR) under variant key KM.C4 formed as the Exclusive OR product of master key KM stored in clear form within the cryptographic facility and directly accessible to IDK instruction 600. Prior to decrypting eKM.C4(PR), PR recovery means 607 performs control vector checking on C4. IDK instruction 600 is aborted if C4 is incorrect or does not specify the correct key usage required by the IDK instruction. The recovered clear value of PR is supplied as an input to keyblk recovery means 612.

Control information retrieval means 608 accepts and parses control information supplied as input to the IDK instruction at 605. Also, control information retrieval means 608 accesses control information stored within the secure boundary of the cryptographic facility, e.g., the Environment Identifier (EID) at 609. Control information retrieval means 608 supplies control information to control information consistency checking means 614 and possibly to other component parts of the IDK instruction, such as a hash algorithm identifier supplied to DSIG verification means 611 (not shown in FIG. 10).

DSIG verification means 611 uses public key PU belonging to the sending cryptographic device to verify the digital signature DSIG generated on ePU(keyblk) at the sending cryptographic device. To accomplish this, a hash value is first calculated on ePU(keyblk) using hash algorithm 512. Hash algorithm 512 may in fact be a set of hash algorithms. In that case, the hash algorithm is selected on the basis of a hash algorithm identifier or other appropriate encoded value passed by the control information retrieval means 608 to the DSIG verification means (not shown in FIG. 10). The clear public key PU obtained from PU recovery means 606 is then used to encrypt the value of DSIG specified as an input at 602. This recovers the original signature block in clear form, which is then parsed to recover the original hash value. The recovered hash value and the calculated hash value are then compared for equality. If this comparison is favorable, then DSIG is considered valid; otherwise, DSIG is not considered valid and IDK instruction 600 is aborted. The signature block recovery and processing of course will depend on the method of digital signature implemented. In the description of the GKSP instruction it was indicated that the signature block may consist of the hash value and padding data or it may be constructed on the basis of a national or international standard, such as International Standards Organization draft international standard (ISO DIS) 9796. Those skilled in the art will appreciate that many possible implementations of the digital signature are possible and that the precise method of digital signatures is unimportant to the invention. What is important is that a method of digital signature is used in the preferred embodiment to ensure that the receiving cryptographic device can authenticate that the to-be-imported DEA key did in fact originate from a valid network cryptographic device. As the reader will also see, the digital signature is made an integral part of the GKSP and IDK instructions themselves, which ensures that the process of signature production and signature verification occurs as part of the key export and key import processes and therefore the highest possible integrity over these processes is achieved. Although it is possible to perform signature production and signature verification as separate instructions, which achieves complete compatibility with the present descriptions of the GKSP and IDK instructions, one also sees that less integrity is achieved. This is so because the signature generate instruction has no way to ensure that a key of the form ePU(keyblk) was in fact produced by the GKSP instruction.

Keyblk recovery means 612 decrypts input ePU(keyblk), provided as an input to the IDK instruction at 603, under private key PR, provided as an output of PR recovery means 607. The recovered clear key block, keyblk, is provided as an output to both eKM.C6K) production means 613 and control information consistency checking means 614.

Control information consistency checking means 614 checks the control information in the recovered keyblk output from keyblk recovery means 612 and the reference control information output from control information retrieval means 608 for consistency. A first check consists in checking control vector C6 in keyblk for consistency with the reference control vector C6 supplied as an input to the IDK instruction at 605. This ensures that the receiving cryptographic application imports a key from with the expected or intended key usage attributes. In this case, reference control vector C6 represents the expected control vector, whereas the recovered control vector C6 represents the actual control vector. The simplest form of consistency checking consists of checking these two control vectors for equality. However, a more refined procedure is possible wherein attributes in the reference control vector are allowed to override corresponding attributes in the recovered control vector. For example, the reference control vector could disable the ability to re-export the imported DEA key K, whereas the recovered control vector may or may not permit the imported DEA key K to be re-exported. More generally, the receiving device may disable any attribute granted within the received control vector. One will appreciate that taking away a right is not the same as granting a right, which only the sending cryptographic device is permitted to do. The IDK instruction can be designed to permit this kind of control vector override or it may not, depending on the desires of the designer of the IDK instruction. A second check consists of checking the EID value in keyblk for equality with the reference EID value supplied as an input to the IDK instruction at 605. This ensures that the receiving cryptographic application imports a key from the expected or intended sending cryptographic device. In this case, the reference EID value is the EID of the intended sending cryptographic device, which is checked against the EID value in keyblk which represents the EID value of the actual sending cryptographic device. A third check consists of checking the EID value in keyblk for inequality with the EI value stored in the cryptographic facility of the receiving device. This ensures that the imported DEA K originated at another cryptographic device, i.e., that A can't import a K produced at A, that B can't import a K produced at B, etc. The usefulness of this check has been discussed previously. In all cases, if the consistency checking fails, then the IDK instruction is aborted.

eKM.C6(K) production means 613 extracts the clear value of DEA key K and the control vector C6 from keyblk, obtained as an output from the keyblk recovery means 612. and K is then encrypted under variant key KM.C6 formed as the Exclusive OR product of master key KM and control vector C6 recovered from C6 to produce the encrypted key value eKM.C6(K). In an alternative embodiment where the reference control vector C6 can override the recovered control vector C6, the value of C6 used to form the variant key KM.C6 can be the reference control vector C6. In yet another alternative embodiment the IDK instruction itself can modify information in the control vector C6, so that K is encrypted with variant key KM.C6', where C6' is the IDK modified value of C6. In any event, the encrypted key eKM.C6(K) is returned to the CFAP as an instruction output at 615.

The reader will appreciate that the IDK instruction has been designed to perform consistency checking within the cryptographic facility in lieu of returning the recovered clear values of C6 and EID to the CFAP and performing this consistency checking outside of the cryptographic facility. In the preferred embodiment, this consistency checking is performed in the cryptographic facility hardware and the recovered clear values of C6 and EID are not exposed outside the CF. The reason for doing this is to ensure that the DEA key distribution channel does not also provide a covert privacy channel whereby secret data may be incorporated in the control information portion of the key block and transmitted from the sending cryptographic device to the receiving cryptographic device. In a good cryptographic design, the cryptographic instructions will perform only those cryptographic functions for which they were designed, and no more. Doing so, limits the ways in which an attacker can manipulate the cryptographic instructions for the purpose of subverting their intended security. For example, a system administrator in charge of security policy for the sending and receiving locations, may have a security policy which prohibits the transmission of private messages over the communications link, for example when the link is dedicated merely to the transmission of new keys. In an alternate security policy where the system administrator is to selectively allow privacy channels, there should be no "back door" method for subverting the system administrator's authority in enabling or prohibiting such privacy channels. The use of the control information transmitted over the separate channel to the receiver, is to enable the recipient to inspect the type of uses imposed on the receive key and allow the recipient the option of rejecting the keyblock. However, an alternate embodiment is possible wherein the recovered clear values of C6 and EID are returned to the CFAP and consistency checking is then performed by the CFAP.

Figure 12:
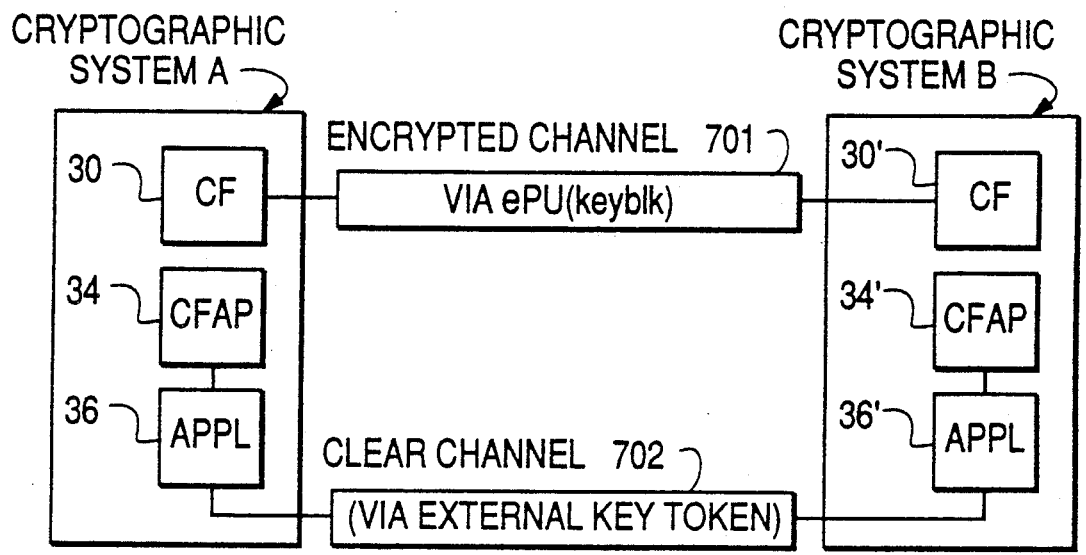
FIG. 12 is a block diagram depicting an encrypted channel and a clear channel between two cryptographic systems A and B.

Control Information: FIG. 12 further illustrates the unique role played by the encrypted key block, ePU(keyblk), and the external key token. Although FIGS. 5, 7, and 8 depict external key token as containing an encrypted key block of the form ePU(keyblk) and reference control information in clear form, in the logical sense there are two information channels over which information flows: (1) and encrypted channel and (2) a clear channel. Referring now to FIG. 12, therein is shown two cryptographic systems, A and B, that communicate via a key distribution protocol through an encrypted channel 701 and a clear channel 702. Encrypted channel 701 is facilitated via the encrypted key block, ePU(keyblk). Control information in keyblk, which is subsequently encrypted with public key PU, is thus sent from A to B via an encrypted channel. Clear channel 702 is facilitated via the external key token. Control information in clear form stored in the external key token is, for all intents and purposes, passed from A to B via a clear channel.

Another distinguishing feature of the two channels is this. Encrypted channel 701 is a logical channel between the cryptographic facility 30 of cryptographic system A and cryptographic facility 30' of cryptographic system B. Clear channel 702 is a logical channel between application 36 in cryptographic system A and application 36' in cryptographic system B. and possibly a logical channel between CFAP 34 in cryptographic system A and CFAP 34' in cryptographic system B, depending on how the external key tokens are to be managed. In any event, the key distribution process is designed such that (1) in the case of encrypted channel 701, only the cryptographic facilities have access to the control information in keyblk, whereas (2) in the case of clear channel 702, the applications and possibly the CFAPs have access to the control information in the external key token as a routine part of the key distribution protocol. Since the CF is typically implemented within secure hardware, the CF is said to have a higher level of integrity than other parts of the the cryptographic system, such as the CFAP and applications operating within the cryptographic system. Thus, a higher degree of protection is achieved within the key distribution process by controlling that process, to the degree possible, from within the CF itself. To this end, control information is passed via encrypted channel 701, in keyblk, from A to B, thus enabling B to process the imported keyblk with a high degree of integrity. Of course, the assumption is made here that digital signatures are also a part of the key distribution process, as shown in FIG. 8, which forms another underpinning or layer of integrity that augments and enhances the overall integrity of information passed via encrypted channel 701.

Figure 13:
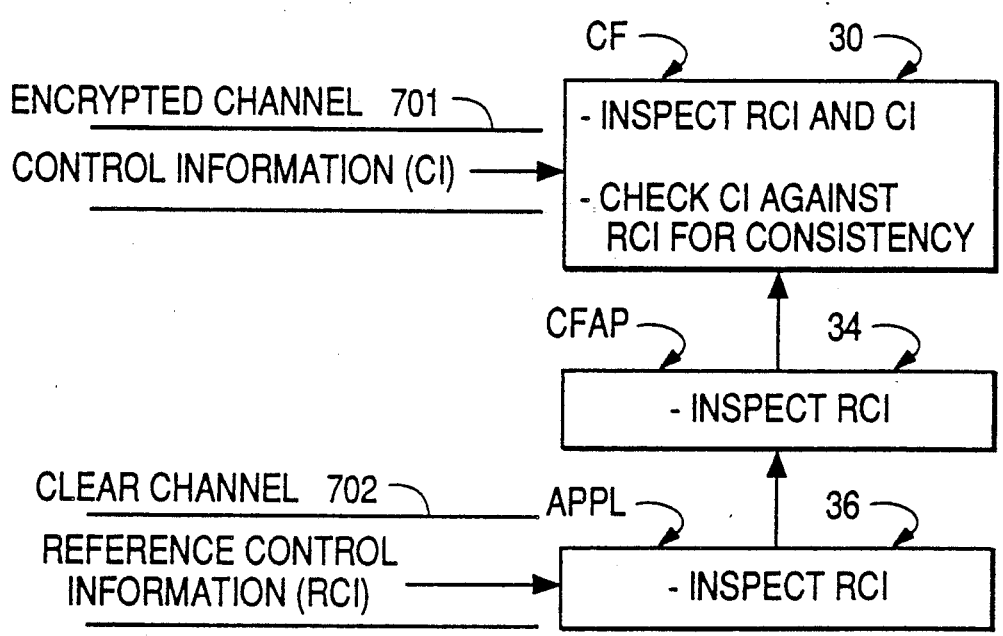
FIG. 13 is a block diagram illustrating the processing of control information at a receiving cryptographic device.

FIG. 13 illustrates the process of reconciliation between control information transmitted via encrypted channel 701 and control information, called reference control information, transmitted via clear channel 702. The importance in having these two channels for passing control information can now be seen. Control information transmitted via encrypted channel 701 can be 'seen' by the cryptographic facility, but by no one outside the cryptographic facility. This ensures that the key distribution channel is not used as a covert privacy channel. Thus, the only way that the application program or the CFAP has of validating the control information transmitted via encrypted channel 701 is the specify reference control information to the CF in clear form. Since it is the application program or the CFAP that specifies the reference control information, the reference control information is consistency checked to determine its accuracy before being passed to the CF. Inside the protected boundary of the CF, the control information recovered from the decrypted keyblk is checked for consistency with the reference control information supplied in clear form by the application to the CFAP and thence by the CFAP to the CF. This permits all parties (CF, CFAP, and application) to be sure that the the control information associated with the to-be-imported key is correct and in accordance with expectations. In summary, all parties look at the reference control information and have a chance to agree or disagree with it, but only the CF sees the control information passed in keyblk and only the CF with highest integrity determines whether the control information received via encrypted channel 701 (i.e., in keyblk) is consistent with the reference control information received in the external key token by the application, or by the CFAP depending on whether key distribution is implemented at the application layer or at the cryptographic facility access program layer. Referring now to FIG. 13, reference control information (designated RCI) received via Clear Channel 702 is inspected by the receiving application program APPL 36. If APPL 36 finds the reference control information to be okay, i.e., it is accurate acceptable, and in accordance with the protocol, in all respects, then APPL 36 will issue a request to CFAP 34 to import the received DEA key, passing the reference control information in the received external key token to CFAP 34. If the CFAP 34 finds the reference control information to be okay, then CFAP 36 will issue an IDK instruction to CF 30 to import the received DEA key, passing the reference control information in the received external key token to CF 30. The control information (designated CI) received via Encrypted Channel 701 and the reference control information RCI received from the CFAP 34 are inspected by themselves for consistency and then they are compared or consistency checked, one against the other, to determine that CI is consistent with RCI. Only if this consistency checking succeeds, will the CF 30 import the DEA key.

Figure 14:
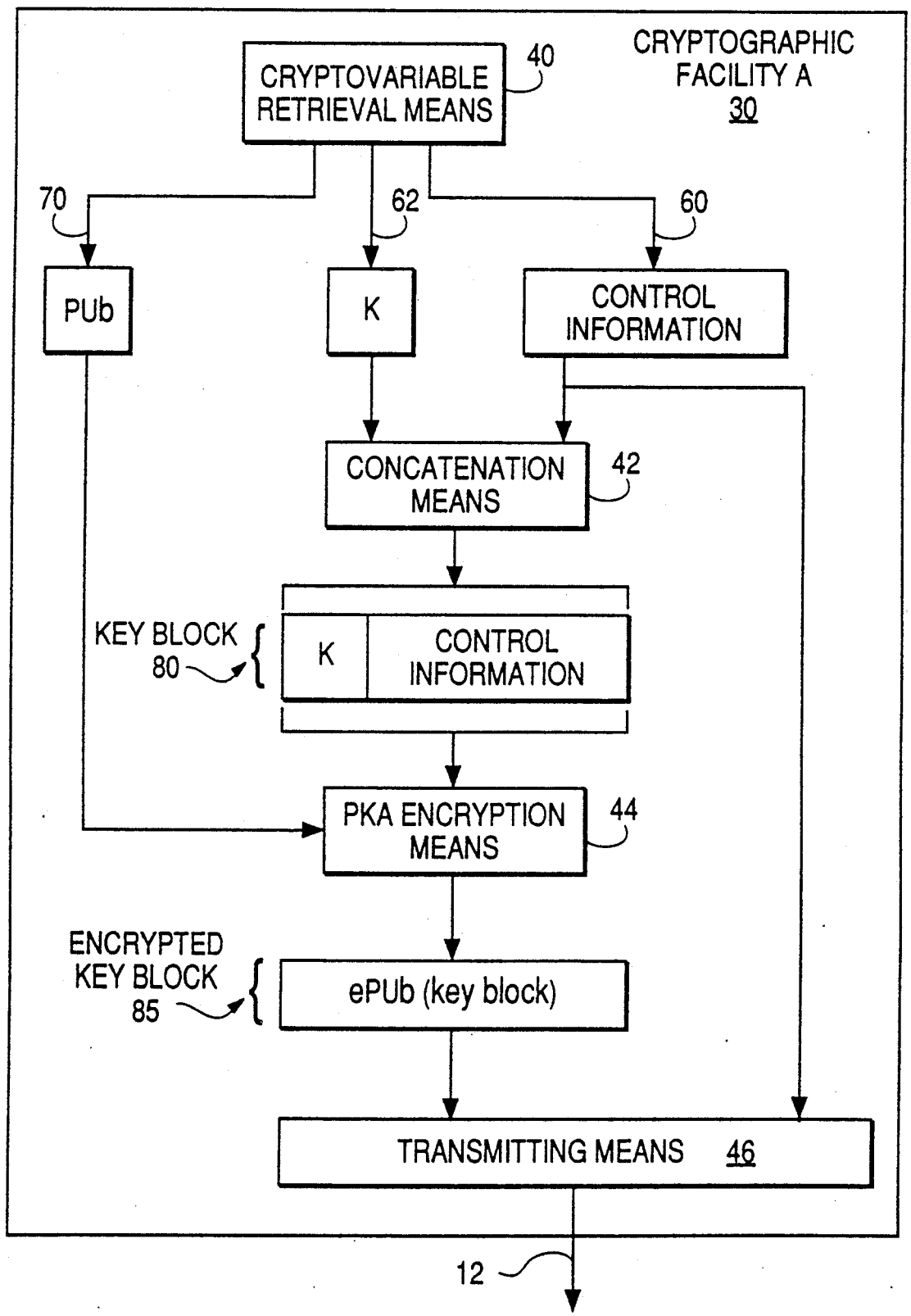
FIG. 14 is a block diagram of a cryptographic facility at a sending location, in accordance with the invention.

FIG. 14 is a block diagram of the cryptographic facility 30 in the sending location A, as it is organized for performing the generate key set PKA [GKSP) instruction, illustrated in FIG. 9. FIG. 14 shows the cryptographic facility 30 at the sending location which includes the crypto variable retrieval means 40, shown in greater detail in FIG. 16. To prepare a crypto variable such as the key K for transmission from the cryptographic facility 30 to the cryptographic facility 30' at the receiving location, the key K is accessed from the crypto variable retrieval means 40 over the line 62 and applied to the concatenation means 42. In addition, control information such as a control vector and an environmental identification are accessed over line 60 from the crypto variable retrieval means 40 and are applied to the concatenation means 42. Concatenation means 42 will concatenate the key K with the control vector and the environmental identification and that will form the key block 80 which is applied to the public key algorithm encryption means 44. The public key is accessed over line 70 from the crypto variable retrieval means 40 and is applied to the key input of the encryption means 44. The key block 80 is encrypted forming the encrypted key block 85 which is then applied to the transmitting means 46. The encrypted key block 85 is then transmitted over the transmission link 12 to the cryptographic facility 30' at the receiving location shown in FIG. 15. The control information consisting of the control vector and the environmental identification which has been accessed over line 60 is also output as a separate information unit to the transmitting means 46 for transmission over the link 12 to the cryptographic facility 30' at the receiving location. The control information, which can be referred here as the reference control information, is separate from the encrypted key block 85. The reference control information can be transmitted over the same physical communications link 12 as the encrypted key block 85, in a different time slot or frequency slot in the case of frequency division multiplexing. Alternately, completely separate physical communication links can be employed to transmit the reference control information as distinguished from the transmission of the encrypted key block 85. The transmission of the reference control information can be in either clear text form, or alternately the reference control information can be encrypted and transmitted over a privacy channel if the sender and receiver share suitable keys.

Figure 15:
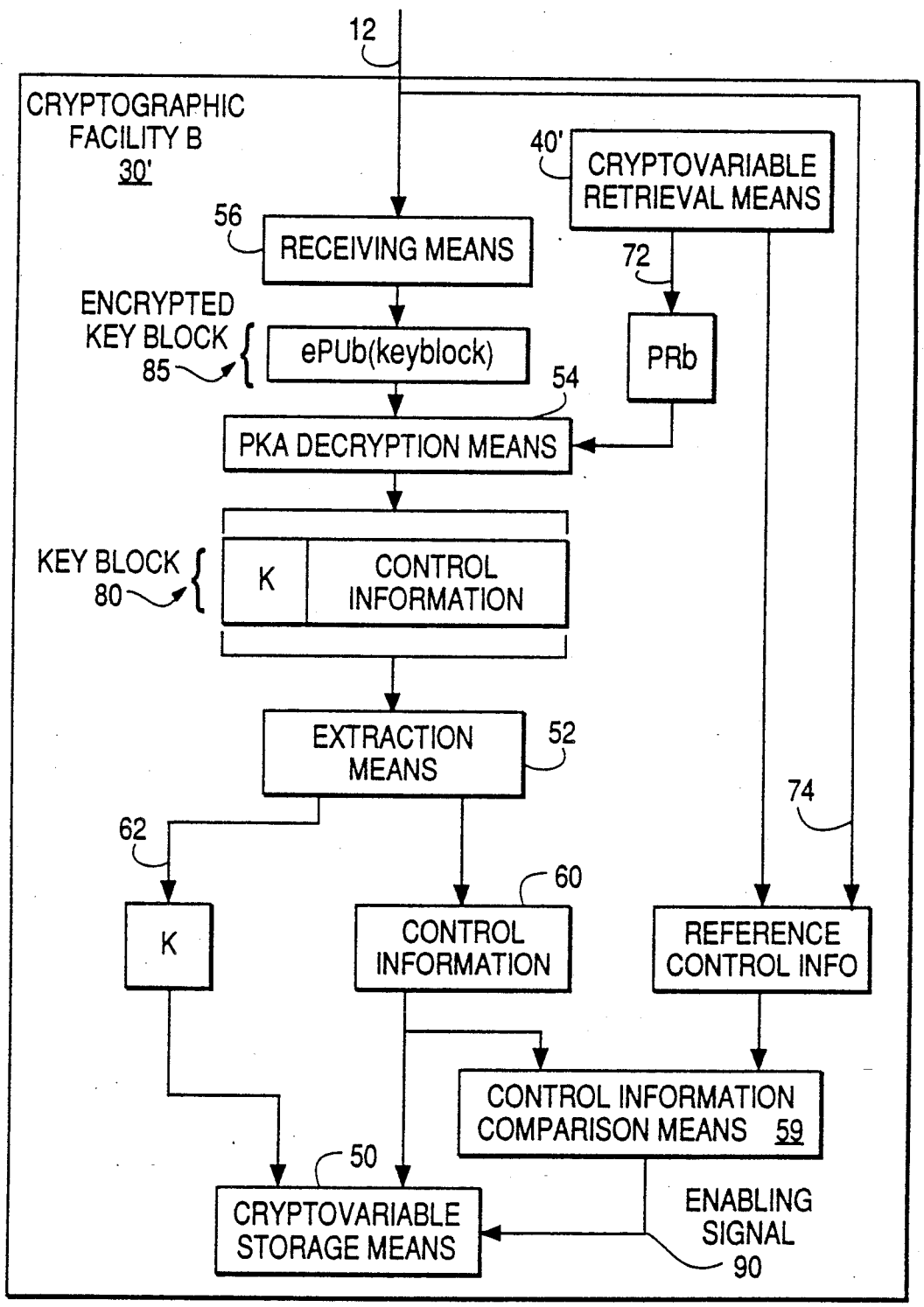
FIG. 15 is a block diagram of a cryptographic facility at a receiving location, in accordance with the invention.

In the receiving cryptographic facility 30' shown in FIG. 15, the reference control information is transferred from the communications link 12 to the overline 74 to the control information comparison means 59. The encrypted key block 85 is transferred from the receiving means 56 to the public key algorithm decryption means 54. A privacy key is accessed over line 72 from the crypto variable retrieval means 40' and is applied to the key input of the decryption means 54. The operation of the decryption means 54 generates the recovered key block 80 which is applied to the extraction means 52. The extraction means 52 extracts the control information 60 from the recovered key block 80 and applies the extracted control information to the control information comparison means 59. The control information comparison means 59 then compares the identity of the extracted control information from the key block 80 with the reference control information received from the communications link 12 over line 74. The control information comparison means 59 has an enabling output signal 90 which is produced if the comparison is satisfied. The enabling signal 90 is applied to an enabling input of the crypto variable storage means 50. The crypto variable, in this example the key K, is output from the extraction means 52 on line 62 and applied to the crypto variable storage means 50. The key K will be successfully stored in a crypto variable storage means 50 if the enabling signal 90 is applied from the comparison means 59. In addition, the control information which can include the control vector and the environmental ID of the sending location, can also be stored in the crypto variable storage means 50, if the enabling signal 90 is present.

Further in accordance with the invention, a comparison can be made between the environmental ID of the receiving station B and the environmental ID of the transmitting station A, in order to ensure that the environmental ID for the receiving station B is not identical with the environmental ID contained in the recovered key block 80. This comparison can also be performed in the comparison means 59 and the successful comparison can be made necessary to the generation of the enabling signal 90 as described above. The environmental ID in the reference control information should successfully compare with the environmental ID extracted by the extraction means 52 from the key block 80. In addition, the environmental ID extracted from the key block 80, which represents the environmental ID of the sending location A, should not be the same as the environmental ID of the receiving station B. When these two conditions exist and also when the control vector in the reference control information successfully compares with the control vector extracted by the extraction means 52 from the key block 80, then the comparison means 59 will output an enabling signal 90 to the storage means 50.

The crypto variable retrieval means 40 and 40' is shown in greater detail in FIG. 16. Input parameters 311 can be transferred over line 33 from the external storage 400 in the CFAP 34. These input parameters can then be applied to the crypto facility 30, over lines 31. Op codes 310 in the CFAP 34 can also be applied over lines 31 to the crypto facility 30. The crypto facility 30 includes the crypto variable retrieval means 40 which contains a random number generator 95, a data encryption algorithm decryption means 410 and an output selection means 420. A master key storage 99 is contained in the crypto facility 30, having an output connected to the key input of the decryption means 410. The random number generator 95 can generate a first type key K' to be applied to the output selection means 420. Alternately, a second type key K" in clear text form can be applied to the output selection means 420. Alternately, a third type key K''' can be applied to the output selection means 420, which is derived from the decryption by the decryption means 410 of an encrypted form of the key K''' which has been encrypted under the exclusive OR product of the master key KM and the control vector C5. The output of the selection means 420 is the key K which is the crypto variable which is discussed in relation to FIGS. 14 and 15.

In the preferred embodiment of the invention, public key encryption is used as the encryption technique for transmitting the key block from the sending location to the receiving location, however, it is within the scope of the invention to use symmetric, private key techniques for enciphering and deciphering the key block. Also, in the preferred embodiment of the invention, where digital signatures are employed, as described above, the public key encryption technique for forming digital signatures is employed. However, in an alternate embodiment, conventional Message Authentication Code (MAC) techniques may be employed using a private key algorithm. In the preferred embodiment of the invention, Data Encryption Standard (DES) key is the crypto variable which is transmitted in the key block from the sending location to the receiving location, however, in alternate embodiments of the invention, the crypto variable can be a public key or a non-key-type expression.

Although a specific embodiment of the invention has been disclosed, it will be understood by those having skill in the art that changes can be made to the specific embodiment without departing from the spirit and the scope of the invention.

What is claimed is:

1. In a data processing system having a plurality of communicating nodes, at least a pair of nodes in the system exchanging cryptographic communications, an apparatus for enabling a first node of the pair to control a crypto variable after its transmission from the first node to a second node of the pair, comprising:

a first storage means at a transmitting node in the system for storing a crypto variable which is to be transmitted to a receiving node in the system;

a second storage means at said transmitting node for storing control information to control said crypto variable after it is transmitted from said transmitting node said control information including a control vector to limit the uses of said crypto variable;

a third storage means at said transmitting node for storing a first key expression;

concatenating means at said transmitting node, coupled to said first and second storage means, for concatenating said crypto variable with said control information, forming a key block;

encryption means at said transmitting node, coupled to said third storage means and said concatenating means, for encrypting said key block with said first key expression, forming an encrypted key block;

transmitting means at said transmitting node coupled to said encryption means and coupled over a communications link to a receiving means at said receiving node, for transmitting said encrypted key block to said receiving node;

said transmitting means coupled to said second storage means, for transmitting a second copy of said control information to said receiving node;

fourth storage means at said receiving node, for storing a second key expression corresponding to said first key expression;

decryption means at said receiving node coupled to said receiving means and to said fourth storage means, for decrypting said encrypted key block using said second key expression, to obtain a recovered key block;

extraction means at said receiving node coupled to said decryption means, to extract said control information and said crypto variable from said recovered key block;

comparison means at said receiving node coupled to said extraction means and coupled to said receiving means for comparing said control information extracted from said recovered key block to said second copy of said control information, said comparison means having an enabling output for signaling when said comparison is satisfied;

control means coupled to said extraction means and having an enabling input coupled to said output of said comparison means, for controlling said crypto variable with said control information.

2. The apparatus of claim 1, which further comprises:

said first key expression being a public key issued by said receiving node and said second key expression being a private key corresponding to said public key.

3. In a processing system having a plurality of communicating nodes, at least a pair of nodes in the system exchanging cryptographic communications, a method for enabling a first node of the pair to control a crypto variable after its transmission from the first node to a second node of the pair, comprising:

storing a crypto variable which is to be transmitted to a receiving node in the system, at a transmitting node;

storing control information to control said crypto variable after it is transmitted from said transmitting node, at said transmitting node said control information including a control vector to limit the uses of said crypto variable;

storing a first key expression at said transmitting node;

concatenating said crypto variable with said control information, forming a key block, at said transmitting node;

encrypting said key block with said first key expression, forming an encrypted key block, at said transmitting node;

transmitting said encrypted key block to said receiving node;

transmitting a second copy of said control information to said receiving node;

storing a second key expression corresponding to said first key expression, at said receiving node;

decrypting said encrypted key block using said second key expression, to obtain a recovered key block, at said receiving node;

extracting said control information and said crypto variable from said recovered key block, at said receiving node;

comparing said control information extracted from said recovered key block with said second copy of said control information and generating an enabling signal when the compare is satisfied;

controlling said crypto variable with said control information when said enabling signal has been generated.

4. The method of claim 3, which further comprise:
said first key expression and said second key expression being symmetric keys.

5. The method of claim 3, which further comprises:
said first key expression being a public key issued by said receiving node and said second key expression being a private key corresponding to said public key.

6. The method of claim 3, which further comprises:
said control information includes a received control vector which defines limitations on uses of said crypto variable.

7. The method of claim 6, which further comprises:
storing a reference control vector characterizing required uses of said crypto variable at said receiving node;
storing said received control vector extracted from said recovered key block, at said receiving node;
comparing said reference control vector with said received control vector, and outputting an acceptance signal if the comparison succeeds, at said receiving node; storing said crypto variable extracted by said extraction means if said acceptance signal is received from said compare means, at said receiving node.

8. The method of claim 7, which further comprises:
storing a master key at said receiving node;
forming an exclusive OR product of said master key and said received control vector, forming a product key expression, at said receiving node;
encrypting said crypto variable under said master key, forming an encrypted crypto variable, at said receiving node;
storing said encrypted crypto variable, at said receiving node.

9. The method of claim 8, which further comprises:
receiving a request from a user for using said crypto variable, at said receiving node;
checking said received control vector to determine if said requested uses are permitted, at said receiving node;
outputting an enabling signal if said requested uses are permitted, at said receiving node;
receiving said enabling signal and in response thereto, forming an exclusive OR product of said master key and said received control vector, forming a product key expression, at said receiving node;
inputting said product key expression, and decrypting said encrypted crypto variable under said master key, recovering said crypto variable, at said receiving node.

10. The method of claim 7, which further comprises:
storing a master key at said receiving node;
forming an exclusive OR product of said master key and said reference control vector, forming a product key expression, at said receiving node;
inputting said product key expression, and encrypting said crypto variable under said master key, forming an encrypted crypto variable, at said receiving node;
storing said encrypted crypto variable, at said receiving node.

11. The method of claim 10, which further comprises:
receiving a request from a user for using said crypto variable, at said receiving node;
checking said reference control vector to determine if said requested uses are permitted, at said receiving node;
outputting an enabling signal if said requested uses are permitted, at said receiving node;
receiving said enabling signal and in response thereto, forming an exclusive OR product of said master key and said reference control vector, forming a product key expression, at said receiving node;
decrypting said encrypted crypto variable under said master key, recovering said crypto variable, at said receiving node.

12. The method of claim 11, wherein said reference control vector is received from said transmitting node.

13. The method of claim 12, which further comprises:
said received control vector is a first hashed product of said reference control vector, received from said transmitting node;
forming a second hash product of said reference control vector, at said receiving node;
comparing said first hashed product with said second hashed product and outputting a second acceptance signal when the comparison is satisfied, at said receiving node.

14. The method of claim 3, which further comprises:
said control information includes a hashed control vector which represents limitations on uses of said crypto variable.

15. The method of claim 14, wherein said control means further comprises:
receiving from said transmitting node and storing a reference control vector characterizing required uses of said crypto variable at said receiving station, at said receiving node;
storing said hashed control vector extracted from said recovered key block, at said receiving node;
forming a hash product of said reference control vector, at said receiving node;
comparing said hash product with said hashed control vector, and outputting an acceptance signal if the comparison succeeds, at said receiving node;
storing said crypto variable extracted by said extraction means if said acceptance signal is hashed from said compare means, at said receiving node.

16. The method of claim 15, which further comprises:
storing a master key at said receiving node;
forming an exclusive OR product of said master key and said hashed control vector, forming a product key expression, at said receiving node;
inputting said product key expression, and encrypting said crypto variable under said master key, forming an encrypted crypto variable, at said receiving node;
storing said encrypted crypto variable, at said receiving node.

17. The method of claim 16, which further comprises:

receiving a request from a user for using said crypto variable, at said receiving node;
checking said reference control vector to determine if checking said reference said requested uses are. permitted, at said receiving node;
outputting an enabling signal if said requested uses are permitted, at said receiving node;
receiving said enabling signal and in response thereto, forming an exclusive OR product of said master key and said hashed control vector, forming a product key expression, at said receiving node;
inputting said product key expression, and decrypting said encrypted crypto variable under said master key, recovering said crypto, variable, at said receiving node.

18. The method of claim 3, which further comprises: said control information includes a transmitting node environment identification which characterizes the identity of said transmitting node.

19. The method of claim 18, which further comprises:
storing a receiving node environment identification, at said receiving node;
storing said transmitting node environment identification extracted from said recovered key block, at said receiving node;
comparing said receiving node environment identification and said transmitting node environment identification and outputting an acceptance signal if the comparison fails, at said receiving node;
storing said crypto variable extracted by said extraction means if said acceptance signal is received from said compare means, at said receiving node.

20. In a data processing system having a plurality of communicating nodes, at least a pair of nodes in the system exchanging cryptograpic communications, a program for execution on the data processing system for enabling a first node of the pair to control a crypto variable after its transmission from the first node to a second node of the pair, comprising:
said program controlling the data processing system for storing a crypto variable which is to be transmitted to a receiving node in the system, at a transmitting node;
said program controlling the data processing system for storing control information to control said crypto variable after it is transmitted from said transmitting node, at said transmitting node said control information including a control vector to limit the uses of said crypto variable;
said program controlling the data processing system for storing a first key expression at said transmitting node;
said program controlling the data processing system for concatenating said crypto variable with said control information, forming a key block, at said transmitting node;
said program controlling the data processing system for encrypting said key block with said first key expression, forming an encrypted key block, at said transmitting node;
said program controlling the data processing system for transmitting said encrypted key block to said receiving node;
said program controlling the data processing system for transmitting a second copy of said control information to said receiving node;
said program controlling the data processing system for storing a second key expression corresponding to said first key expression, at said receiving node;
said program controlling the data processing system for decrypting said encrypted key block using said second key expression, to obtain a recovered key block, at said receiving node;
said program controlling the data processing system for extracting said control information and said crypto variable from said recovered key block, at said receiving node;
said program controlling the data processing system for comparing said control information extracted from said recovered key bock with said second copy of said control information and generating an enabling signal when the compare is satisfied;
said program controlling the data processing system for controlling said crypto variable with said control information when said enabling signal has been generated.

21. The program of claim 20, which further comprises:
said first key expression being a public key issued by said receiving node and said second key expression being a private key corresponding to said public key.

22. In a data processing system having a plurality of communicating nodes, at least a pair of nodes in the system exchanging cryptographic communications an apparatus for enabling a first ode of the pair to control a crypto variable after its transmission from the first node to a second node of the pair, comprising:
a storage means at a transmitting node in the system for storing a crypto variable which is to be transmitted to a receiving node in the system;
said storage means storing control information including a control vector to control said crypto variable after it is transmitted from said transmitting node;
said storage means for storing a first key expression;
concatenating means at said transmitting node, coupled to said storage means, for concatenating said crypto variable with said control information, forming a key block;
encryption means at said transmitting node, coupled to said storage means and said concatenating means, for encrypting said key block with said first key expression, forming an encrypted key block; and
transmitting means at said transmitting node coupled to said encryption means and coupled over a communications link to a receiving means at said receiving node, for transmitting said encrypted key block to said receiving node.

23. In a data processing system having a plurality of communicating nodes, at least a pair of nodes in the system exchanging cryptographic communications, an apparatus for enabling a first node of the pair to control a crypto variable after its transmission from the first node to a second node of the pair, comprising:
a storage means at a transmitting node in the system for storing a crypto variable which is to be transmitted to a receiving node in the system;
said storage means storing control information including a control vector to control said crypto variable after it is transmitted from said transmitting node;
said storage means storing a first key expression;

concatenating means at said transmitting node, coupled to said storage means, for concatenating said crypto variable with said control information, forming a key block;

encryption means at said transmitting node, coupled to said storage means and said concatenating means, for encrypting said key block with said first key expression, forming an encrypted key block; and transmitting means at said transmitting node coupled to said encryption means and coupled over a communications link to a receiving means at said receiving node, for transmitting said encrypted key block to said receiving node.

second storage means at said receiving node, for storing a second key expression corresponding to said first key expression;

decryption means at said receiving node coupled to said receiving means and to said second storage means for decrypting aid encrypted key block using said second key expression, to obtain a recovered key block;

extraction means at said receiving node coupled to said decryption means, to extract said control information and said crypto variable from said recovered key block;

validating means at aid receiving node coupled to said extraction means for validating said control information extracted from aid recovered key block, said validating means having an enabling output for signaling when said control information is valid;

control means coupled to said extraction means and having an enabling input coupled to said output of said validating means, for controlling said crypto variable with said control information.

24. Apparatus for generating and distributing a Data Encryption Algorithm (DEA) key in a communications network, comprising:
a) sending means for generating and producing at least two copies of a key-encrypting key (K-ek), and control information including a control vector for permitted uses of the k-ek;
b) means included in the sending means for encrypting one copy of the k-ek under the public key of a receiving means and transmitting the public key encrypted k-ek to the receiving means in association with said control information;
c) means further included in the sending means for encrypting another copy of the k-ek under a master key of the sending means;
d) means further included in the sending means for storing the master key encrypted k-3k as a common distributing key for other encrypted keys used in the network, in association with said control information;
e) control means included in the sending means, to limit uses of the k-ek to said permitted uses in response to said control information.

25. In a data processing system having a plurality of communicating nodes, at least a pair of nodes in the system exchanging cryptographic communications, a method for enabling a first node of the pair to control a crypto variable after its transmission from the first node to a second node of the pair, comprising:

concatenating a crypto variable with control information including a control vector to control said crypto variable after it is transmitted from said transmitting node, forming a key block, at said transmitting node;

encrypting said key block with a first key expression, forming an encrypted key block, at said transmitting node;

transmitting said encrypted key block to said receiving node;

decrypting said encrypted key block using a second key expression, to obtain a recovered key block, at said receiving node;

extracting said control information and said crypto variable from said recovered key block, at said receiving node;

validating said control information extracted from said recovered key block and generating an enabling signal;

controlling said crypto variable with said control information when said enabling signal has been generated.

* * * * *